United States Patent
Anwar et al.

(10) Patent No.: US 7,533,376 B2
(45) Date of Patent: May 12, 2009

(54) DYNAMIC LINKING IN CONSTRAINED ENVIRONMENT

(75) Inventors: Majid Anwar, Glasgow (GB); Paul Gardiner, Oxfordshire (GB)

(73) Assignee: Picsel (Research) Limited, Braehead, Glasgow (GB)

( * ) Notice: Subject to any disclaimer, the term of this patent is extended or adjusted under 35 U.S.C. 154(b) by 374 days.

(21) Appl. No.: 10/964,232

(22) Filed: Oct. 12, 2004

(65) Prior Publication Data

US 2006/0080635 A1    Apr. 13, 2006

(51) Int. Cl.
G06F 9/44    (2006.01)
G06F 9/45    (2006.01)

(52) U.S. Cl. .................. 717/162; 717/146; 717/147

(58) Field of Classification Search ............... 717/162, 717/146–147
See application file for complete search history.

(56) References Cited

U.S. PATENT DOCUMENTS

| | | | | |
|---|---|---|---|---|
| 5,428,792 | A * | 6/1995 | Conner et al. | 717/143 |
| 5,432,937 | A | 7/1995 | Tevanian et al. | |
| 6,074,432 | A * | 6/2000 | Guccione | 717/108 |
| 6,289,506 | B1 * | 9/2001 | Kwong et al. | 717/148 |
| 6,332,215 | B1 * | 12/2001 | Patel et al. | 717/141 |
| 6,460,178 | B1 | 10/2002 | Chan et al. | |
| 6,496,843 | B1 * | 12/2002 | Getchius et al. | 715/210 |
| 6,499,137 | B1 * | 12/2002 | Hunt | 717/164 |
| 6,708,330 | B1 * | 3/2004 | Moberg et al. | 717/158 |
| 6,986,148 | B2 | 1/2006 | Johnson et al. | |
| 7,093,263 | B1 * | 8/2006 | Sexton et al. | 719/316 |
| 7,155,702 | B2 * | 12/2006 | Krishna et al. | 717/108 |
| 7,162,711 | B2 * | 1/2007 | Czajkowski et al. | 717/114 |
| 7,191,433 | B2 * | 3/2007 | Narad et al. | 717/140 |
| 2003/0018825 | A1 | 1/2003 | Johnson et al. | |
| 2003/0033535 | A1 * | 2/2003 | Fisher et al. | 713/185 |
| 2003/0070161 | A1 * | 4/2003 | Wong et al. | 717/148 |
| 2003/0149743 | A1 | 8/2003 | Baluja et al. | |
| 2005/0050315 | A1 | 3/2005 | Burkhardt et al. | |
| 2005/0262502 | A1 | 11/2005 | Lari et al. | |

(Continued)

OTHER PUBLICATIONS

"Dynamic Linking and Loading"; Internet Article, Online; Jun. 15, 1999, pp. 1-8.

(Continued)

*Primary Examiner*—Wei Y Zhen
*Assistant Examiner*—Chih-Ching Chow
(74) *Attorney, Agent, or Firm*—Drinker Biddle & Reath LLP

(57) ABSTRACT

A platform independent binary object (PIBO) operable on disparate computing environments that have a selected hardware architecture without requiring rebuilding or reloading is provided. The PIBO can be parsed to generate source-code stub file. The PIBO can be loaded and linked with a cooperating computing application by an exemplary linker/loader employing the stub file. Also, the PIBO can be used in various contexts, including but not limited to, as a mechanism for dynamically linking shared objects on platforms that do not offer such native facility; in utilizing pre-written code components on platforms that otherwise would be incompatible due to a violation of platform constraints within particular code; as a mechanism for loading non object-oriented code that circumvents restrictions of multiple execution instances and repeat execution inherent in the code; and as mechanism that allows for the use of a binary object to add on functionality on a closed platform.

26 Claims, 14 Drawing Sheets

U.S. PATENT DOCUMENTS

2006/0080648 A1* 4/2006 Anwar et al. ................ 717/163

OTHER PUBLICATIONS

Wolf et al., "OS/2'S Dynamic Link, OS/2's Powerful Interface to Applications, DLLs Enhance and Expand the Operating System to an Extent Not Possible Under DOS", PC Tech Journal, PC Tech Co., Baltimore, MD, vol. 6, No. 9, Sep. 1988, pp. 101-108.

Lewycky et al., "DirectX and Wine", Internet Article, Online, Jul. 16, 2001, pp. 1-9.

Newsome et al.; "Proxy Compilation of Dynamically Loaded Java Classes with MoJo"; Jun. 2002, ACM, pp. 204-212.

Lee et al., "Basic Compiler Algorithms for Parallel Programs", May 1999, ACM, pp. 1-12.

Sami Rautianen; Travelling with Linux Malware is Linux Security for Real?; Information Security Technical Report, vol. 6, No. 4 (2001) pp. 58-64.

* cited by examiner

DYNAMIC LINKING IN CONSTRAINED ENVIRONMENT

CROSS REFERENCE

This application cross references the following pending U.S. patent applications: Ser. No. 10/964,231, entitled "Concurrent Code Loading Mechanism," filed Oct. 12, 2004, Ser. No. 10/964,272, entitled "Mechanism To Circumvent Restrictions Of Pre-Written Code Components," filed Oct. 12, 2004, Ser. No. 10/964,315, entitled "Mechanism To Extend Functionality In A Restricted Computing Environment," filed Oct. 12, 2004, Ser. No. 10/965,361, entitled "Platform Independent Dynamic Linking," filed Oct. 12, 2004, which are hereby incorporated by reference in their entirety.

FIELD OF INVENTION

The present invention relates to the creation and operation of a binary object and, more particularly, to the creation, operation and distribution of a platform independent binary object operable across disparate computing environments enabling, among other things, various non-native computing environment operations.

BACKGROUND

Computing environments are capable of executing computer code that contains one or more instructions for the computing environment's hardware components to perform one or more operation. Typically computer code is loaded onto a computing environment for execution. Prior to the physical loading, the computer code can be compiled so that it operates on a particular computing environment (e.g., a computing environment's operating system and/or a computing environment's platform). The computer code can be linked by the computing environment with other computer code residing on the computing environment to execute one or more operations. Depending on the computing environment handling of given computer code, a binary object can be created for use by the computing environment and/or other cooperating computer code. The binary object may contain information, functions, and/or operations desired by one or more cooperating computing programs (computing programs).

One or more functions, in turn, can be aggregated in one or more libraries for use by computing applications, other libraries, or by a computing environment to perform one or more operations. In a general practice, a library is designed and implemented such that it can be utilized by a singular computing environment having a specific hardware architecture. The library can be utilized by a given computing environment on either a static basis or on a dynamic basis. In the static context, the libraries and other components of a given computing application are combined into a single file which can be loaded into memory and executed. Comparatively, with dynamic operations (e.g., dynamic linking of components) functions and components (e.g., objects and libraries) are made available when a computing application is executed. Dynamic components can be shared by several computing applications operating on a computing environment since dynamically linked components, in their design and operation, are not tied to a main part of a computing application.

However, current practices can be cumbersome when creating and executing computer code for operation on disparate computing environments. Since current practices generally require the creation and execution of computer code for a specific computing environment (e.g., through a software development kit—SDK) having a particular computing hardware architecture, it can be difficult to create a single binary object for operation on a number of disparate computing environments (e.g., having various operating systems and/or computing platforms). When creating code for a particular computing environment, the computer code can be compiled in advance of loading it onto the computing environment and can be linked by the computing environment when executing the computer code. With these constraints, computer code is generally designed and created to operate on a singular computing environment (i.e. operating system and/or platform).

Additionally, computing environments can impose constraints and rules on the manner in which computer code should be created so that it can properly execute on a given computing environment. For example, a platform and/or operating system (e.g., SymbianOS running Symbian Quartz) can maintain a number of constraints on computer code being executed on the particular platform and/or operating system, including but not limited to, the use of writeable static and/or global variables. Stated differently, the platform and/or operating system can forbid the operation of computer code having writeable static, or global variables.

A common practice among computer code developers includes, but is not limited to, developing various code performing the same operations but built for each of a disparate set of operating systems and platforms. For example, a calendaring computing application can be developed using a single high level programming language such as Java, "C++", or Visual Basic. In an effort to reduce development time and resources, core computing application code can be reused by developers. However, the extent of such reuse is limited since with current practices additional components (e.g., libraries, functions, data structures, etc.) need to be developed and customized to ensure that the computing application is operable on each of a set of disparate computing environments (e.g., operating systems and/or platforms).

Conventional practices and approaches have other limitations including, but not limited to, an inability of having a single platform independent binary object that can be operable across a plurality of disparate computing environments without requiring rebuilding or recompiling for each of the disparate computing environments. Additionally, current practices and approaches do not offer a mechanism for dynamically linking shared objects on platforms that do not offer such native facility. Also, with current practices, pre-written code components can not be utilized on platforms that otherwise would be incompatible due to a violation of platform constraints within particular code. Further, current practices do not offer a mechanism for loading non object-oriented code that circumvents restrictions of multiple execution instances and repeat execution inherent in the code. Also, current practices and approaches do not offer a mechanism that allows for the dynamic linking and loading of a binary object on a closed platform (e.g., a platform that may restrict the execution of additional programs).

SUMMARY

The herein described systems and methods provide for a platform independent binary object (PIBO) operable on disparate computing environments having a selected hardware architecture without requiring recompiling, rebuilding or reloading. In an illustrative implementation, a binary object file is provided having a selected structure (e.g., object file format). The binary object file can be created by compiling source code such that the source code, when created, does not have platform dependencies. In an illustrative implementation, the binary object file comprises binary code and data for a source file. Moreover, in the illustrative implementation, an exemplary parser is provided that operates on the exemplary binary object file to generate a source-code stub file. Additionally, an exemplary linker/loader is provided that operates as part of an exemplary computing application to link and load the platform independent binary object using the stub file and to allow cooperation with cooperating computing programs on the disparate computing environments. Also, an exemplary interface can be provided that allows cooperating computing applications access to the exemplary PIBO.

In an illustrative operation, the PIBO file can be parsed by the exemplary parser to generate a stub file as source code. The stub file source code is such that it does not maintain platform dependencies. The exemplary linker/loader and stub file can be compiled, for the one of the disparate computing environments, along with the main source code of the cooperating computing application to generate a binary executable operable on the one of the disparate computing environments (and/or platforms). In an illustrative implementation, the exemplary linker/loader can operate to link and load the PIBO with the cooperating computing application during the execution of the cooperating computing application. In the illustrative implementation, the linker/loader can handle symbol resolution and relocation to bind the cooperating computing application binary executable with the PIBO as a fully runnable process.

In an illustrative implementation, the PIBO can be used in various contexts, including but not limited to, as a mechanism for dynamically linking shared objects on platforms that do not offer such native facility; in utilizing pre-written code components on platforms that otherwise would be incompatible due to a violation of platform constraints within particular code; as a mechanism for loading non object-oriented code that circumvents restrictions of multiple execution instances and repeat execution inherent in the code; and as a mechanism that allows for the use of a platform independent binary object to provide add-on functionality on a closed platform.

Other features of the invention are further described below.

BRIEF DESCRIPTION OF THE DRAWINGS

The platform independent dynamic object and methods of use are further described with reference to the accompanying drawings in which.

DETAILED DESCRIPTION

Figure 1:
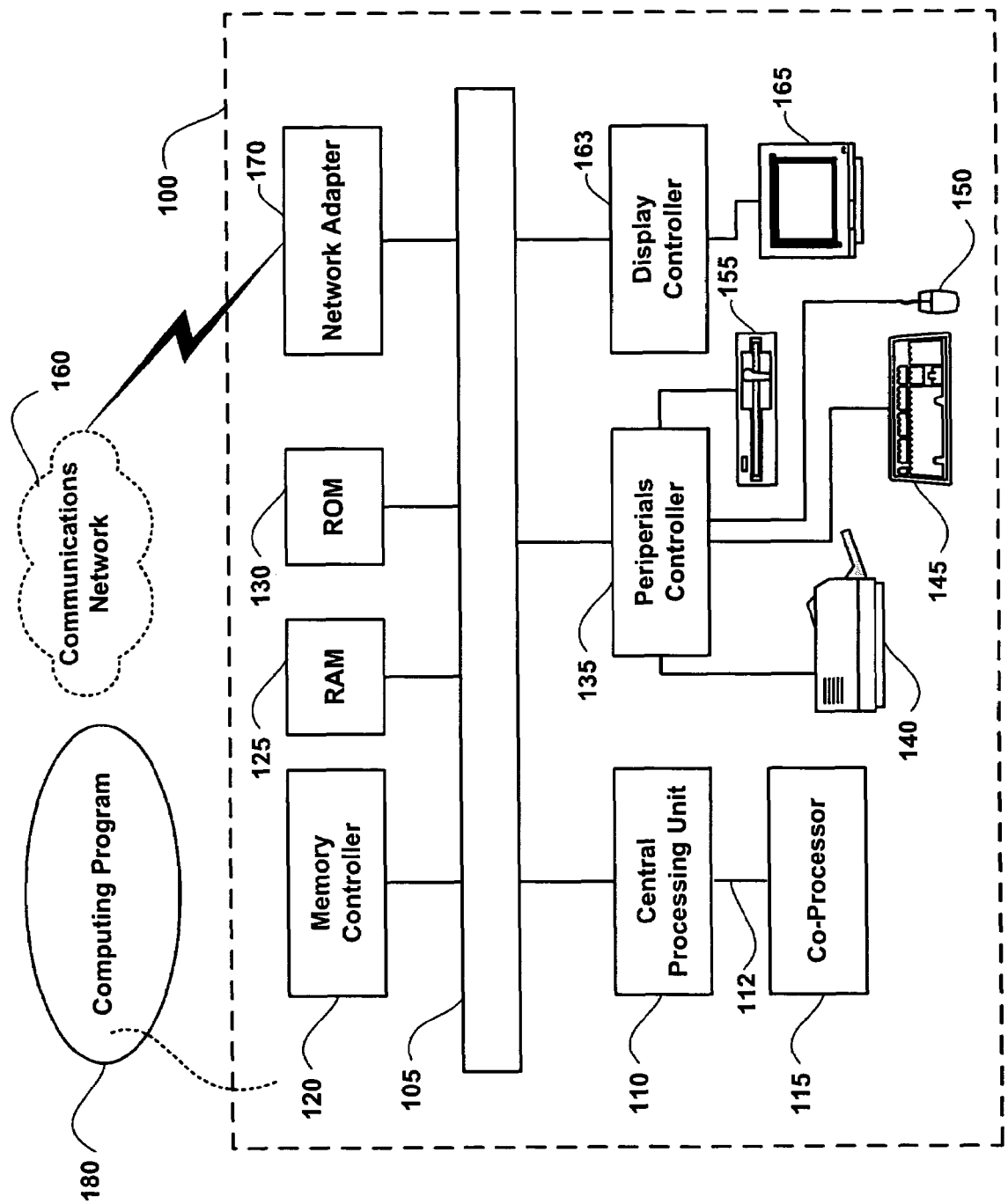
FIG. 1 is a block diagram of an exemplary computing environment in accordance with an implementation of the herein described systems and methods.

Overview:

Computer code can execute on a central processing unit (CPU) or other computer processor within a computer system or device. Common examples of CPU architectures include but are not limited to, the INTEL® x86 family, the ARM® RISC (reduced instruction set code) architecture, SUN® SPARC, and MOTOROLA® 68000. Code can be written in a high level language such as "C," "C++," or JAVA® that can be understood by humans, but ultimately the code can be subsequently compiled and assembled by a computing environment into machine instructions that execute on an exemplary computer processor.

The CPU can reside within a software environment generally known as the system platform. The platform can include an operating system, such as MICROSOFT® WINDOWS® and Linux for larger form factor computing environments (e.g., desktop, laptop personal computers). For smaller form factor computing environments (e.g., mobile and telecoms devices), there are various operating systems in current use, including but not limited to, Linux, SymbianOS, WindowsCE®, PalmOS, BREW, REX, and Itron.

The platform often can maintain additional functionality that extends the OS for specific purposes. For example, the WinCE.NET, Smartphone and PocketPC platforms employ the Windows CE operating system, but differ in other aspects such as the user interface—i.e., WinCE.NET can be targeted at industrial devices, PocketPC can be targeted at personal digital assistants (PDAs) with a touch screen, and Smartphone can be targeted at mobile cellular phones operated via a keypad. The platform can also include extended functionality that is tailored to a particular computing application. In the example provided, the PocketPC platform can maintain a range of functionality for personal information management on a PDA, whereas the Smartphone platform can be packaged with communications functionality suitable for a mobile phone.

In conventional systems, creating binary code that can run on a specific platform can be accomplished by compiling and building the code through a tool chain such as a software development kit (SDK) provided for the specific platform (and/or operating system). Different SDKs can be required to develop code for different platforms operating on a given operating system (e.g., Symbian Quartz can require a different SDK than Symbian Crystal). If an improper SDK is used to develop code for a particular platform, the resulting binary can be inoperable on the desired platform.

At the source code level, some operating systems impose constraints and rules on the way code is written. For example, the SymbianOS requires that code be created to not employ writeable static or global variables. As a result of such constraints, legacy code written originally for one OS may not compile on another OS requiring different coding rules. Nevertheless, a common practice is to write a single source code program that may be subsequently built for multiple platforms. When implemented, a common source file can be developed. The common source file can be processed separately through the tool chains of the chosen platforms to create multiple distinct and platform specific binary outputs from the single source file.

Dynamic Linking and Loading:

A computer program can be comprised of a number of components. When the program is run, the components can be brought together to form a complete, functioning system and can be loaded into main memory of a cooperating computing environment executing the program. The process of combining the components of a computer program is known as linking. For the case when program components are combined into one single file, that can be loaded into memory and executed, such process is described as "static linking." Generally, the linker is part of the tool chain that can concatenate the component object files that can act as input to the linker, and can link the object files together to form a single output file. When a program is made up of multiple subprograms, reference of one subprogram to another can be made through symbols (such as variables and function names). Among other functions and operations, the linker can operate to resolve the reference by noting the symbol's (or symbols') location in a cooperating computing environment's memory and patching the object code of the calling subprogram so that the call instruction refers to the noted memory location.

In "static linking," when a program makes a call to a function stored in another component, the code for the required function can be incorporated in the executable by a static linker. In effect the static linker copies the code of all required functions into an output executable file. By contrast, "dynamic linking" can make functions and components available only during the execution of a program. Since dynamically linked components are generally not tied to the main part of the program, they can be shared by several executed programs. The main program can also be significantly smaller than a statically linked counterpart since the actual code does not become part of the program's executable and since the dynamically linked components exist as separate files. "Dynamic linking" is prevalent among current computing environments. For example, in MICROSOFT® WINDOWS®, the dynamically linked components are called DLLs (dynamic linked libraries) and in Unix/Linux they are called shared object (.so) files.

In the instance a program makes a call to a function in a dynamically linked library, the compiler and linker can generate relocation tables that contain information which, at run time, can allow a cooperating computing environment to load a library and find the code for the required function. In dynamic linked libraries, symbols are not bound to actual addresses until the program that uses the library starts running (known as "load-time dynamic linking") or until the program makes the first call ("run-time dynamic linking").

Dynamic executables can be executed under the control of a dynamic linker/loader. These applications have dependencies in the form of dynamic libraries (or shared objects), which can be located and bound by the dynamic linker to create a runnable process. Shared objects can also have dependencies on other shared objects, also managed by the dynamic linker. With conventional approaches, the routines for dynamic linking and loading that handle binding, symbol resolution, and code relocation that allow the combined executable and shared objects to run as a complete program are generally part of a computing environment's operating system.

In practice, dynamic libraries can be linked at load time. When the dynamic library is created, a small stub file or import library is generated, which supplies the computing environment with information (such as symbol and relocation tables) that can be used to load the dynamic library and locate the functions it exports. The import library (or stub file) can be linked when the main executable program is generated, so that all the function locations within the shared object library are known to the executable program, even though the actual binary code of the shared object remains separate.

Illustrative Computing Environment

FIG. 1 depicts an exemplary computing system 100 in accordance with herein described system and methods. Computing system 100 is capable of executing a variety of computing programs 180. Exemplary computing system 100 is controlled primarily by computer readable instructions, which may be in the form of software, and which also provide instructions for where and how such software is stored or accessed. Such software may be executed within central processing unit (CPU) 110 to cause data processing system 100 to do work. In many known computer servers, workstations and personal computers central processing unit 110 is implemented by micro-electronic chips CPUs called microprocessors. Coprocessor 115 is an optional processor, distinct from main CPU 110, that performs additional functions or assists CPU 110. CPU 110 may be connected to co-processor 115 through interconnect 112. One common type of coprocessor is the floating-point coprocessor, also called a numeric or math coprocessor, which is designed to perform numeric calculations faster and better than general-purpose CPU 110.

It is appreciated that although an illustrative computing environment is shown to comprise a single CPU 110 such description is merely illustrative as computing environment 100 may comprise a number of CPUs 110. Additionally computing environment 100 may exploit the resources of remote CPUs (not shown) through communications network 160 or some other data communications means (not shown).

In operation, CPU 110 fetches, decodes, and executes instructions, and transfers information to and from other resources via the computer's main data-transfer path, system bus 105. Such a system bus connects the components in computing system 100 and defines the medium for data exchange. System bus 105 typically includes data lines for sending data, address lines for sending addresses, and control lines for sending interrupts and for operating the system bus.

An example of such a system bus is the PCI (Peripheral Component Interconnect) bus. Some of today's advanced busses provide a function called bus arbitration that regulates access to the bus by extension cards, controllers, and CPU 110. Devices that attach to these busses and arbitrate to take over the bus are called bus masters. Bus masters support also allows multiprocessor configurations of the busses to be created by the addition of bus master adapters containing a processor and its support chips.

Memory devices coupled to system bus 105 include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space. Stated differently, the program cannot access memory within another process's virtual address space unless memory sharing between the processes has been set up.

In addition, computing system 100 may contain peripherals controller 135 responsible for communicating instructions from CPU 110 to peripherals, such as, printer 140, keyboard 145, mouse 150, and data storage drive 155.

Display 165, which is controlled by display controller 163, is used to display visual output generated by computing system 100. Such visual output may include text, graphics, animated graphics, and video. Display 165 may be implemented with a CRT-based video display, an LCD-based flat-panel display, gas plasma-based flat-panel display, a touch-panel, or other display forms of various form factors. Display controller 163 includes electronic components required to generate a video signal that is sent to display 165.

Further, computing system 100 may contain network adaptor 170 which may be used to connect computing system 100 to an external communication network 160. Communications network 160 may provide computer users with means of communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

It is appreciated that exemplary computer system 100 is merely illustrative of a computing environment in which the herein described systems and methods may operate and does not limit the implementation of the herein described systems and methods in computing environments having differing components and configurations as the inventive concepts described herein may be implemented in various computing environments having various components and configurations.

Figure 2:
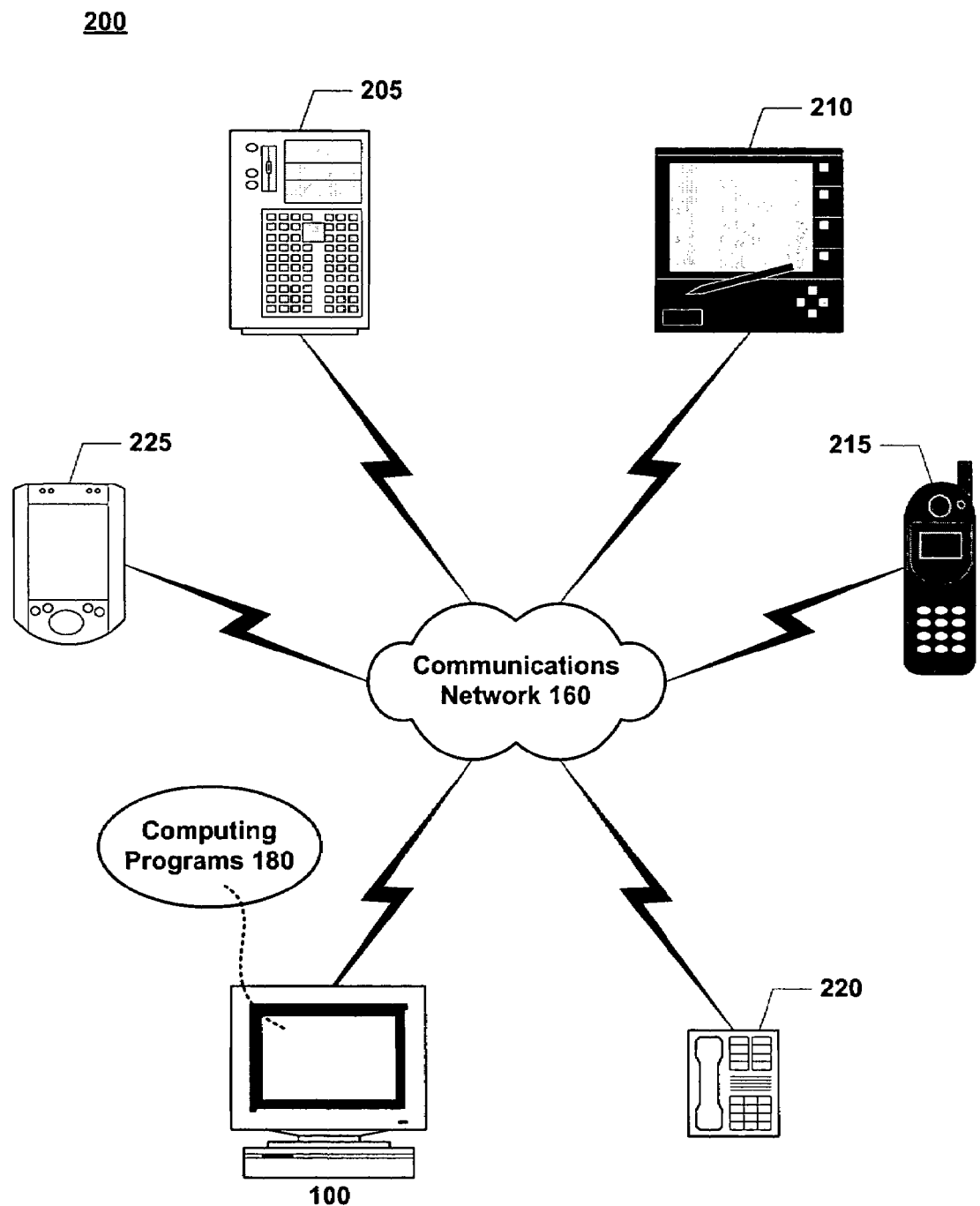
FIG. 2 is a block diagram showing the cooperation of exemplary components of an exemplary data communications architecture.

Illustrative Computer Network Environment:

Computing system 100, described above, can be deployed as part of a computer network. In general, the above description for computing environments applies to both server computers and client computers deployed in a network environment. FIG. 2 illustrates an exemplary illustrative networked computing environment 200, with a server 205 in communication with client computers via a communications network, in which the herein described apparatus and methods may be employed. As shown in FIG. 2 server 205 may be interconnected via a communications network 160 (which may be any of, or a combination of a fixed-wire or wireless LAN, WAN, intranet, extranet, peer-to-peer network, the Internet, or other communications network) with a number of client computing environments such as tablet personal computer 210, mobile telephone 215, telephone 220, personal computer 100, and personal digital assistant 225. Additionally, the herein described apparatus and methods may cooperate with automotive computing environments (not shown), consumer electronic computing environments (not shown), and building automated control computing environments (not shown) via communications network 160. In a network environment in which the communications network 160 is the Internet, for example, server 205 can be dedicated computing environment servers operable to process and communicate data to and from client computing environments 100, 210, 215, 220, and 225 via any of a number of known protocols, such as, hypertext transfer protocol (HTTP), file transfer protocol (FTP), simple object access protocol (SOAP), or wireless application protocol (WAP). Each client computing environment 100, 210, 215, 220, and 225 can be equipped with one or more computing programs 180 such as a web browser (not shown), or a mobile desktop environment (not shown) to gain access to server computing environment 205.

In operation, a user (not shown) may interact with a computing program running on a client computing environments to obtain desired data and/or computing programs. The data and/or computing applications may be stored on server computing environment 205 and communicated to cooperating users through client computing environments 100, 210, 215, 220, and 225, over exemplary communications network 160. A participating user may request access to specific data and applications housed in whole or in part on server computing environment 205. Such data communication may be communicated between client computing environments 100, 210, 215, 220, and 220 and server computing environments for processing and storage. Server computing environment 205 may host computing programs, processes and applets for the generation, authentication, encryption, and communication of data and may cooperate with other server computing environments (not shown), third party service providers (not shown), network attached storage (NAS) and storage area networks (SAN) to realize such data transactions.

Thus, the apparatus and methods described herein can be utilized in a computer network environment having client computing environments for accessing and interacting with the network and a server computing environment for interacting with client computing environments. However, the apparatus and methods providing the mobility device platform can be implemented with a variety of network-based architectures, and thus should not be limited to the example shown.

Platform Dependent Linking:

Executable programs are generally platform dependent. Stated differently, a given program when developed is intended to run on a specific platform so that it has to be compiled, linked and built for the specific platform. Also, the resulting binary executable file produced from such a process will generally not run on a different platform. In conventional systems, it can be necessary to build separate dynamic libraries for each individual operating system. In the case where multiple operating systems are to be supported, the library code is to be built into multiple shared objects (dynamic libraries) i.e., one for each operating system, using dedicated tools. If the code does not explicitly reference items that are unique to an individual platform, then it can be sufficient to create the shared object library for a given operating system in question and have it function on several platforms derived from that operating system. In contrast, if the library code has explicit dependencies to platform-unique functions, then the shared object is to be built specifically for a given platform and, generally, will not operate on other platforms that lack the explicit dependency.

In the instance an operating system supports multiple platforms, the set of program components would typically include, but are not limited to the following components: an executable binary, uniquely tied to the platform; and an optional set of shared objects (dynamic libraries) built for the operating system on which the platform is based.

Figure 3:
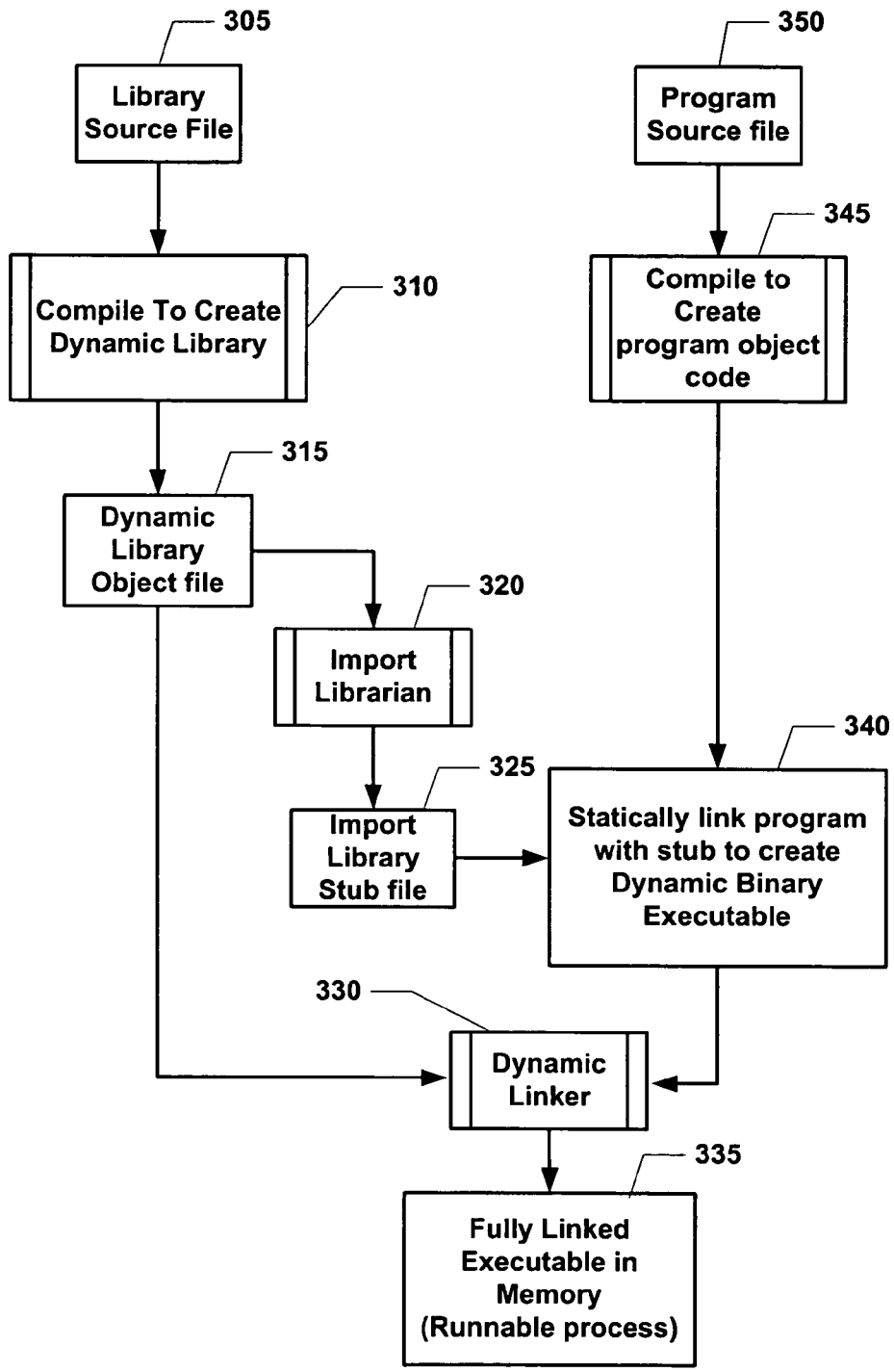
FIG. 3 is a block diagram of a dynamic linking architecture.

FIG. 3 illustrates the process performed by an exemplary computing environment 300 when performing "dynamic linking." As is shown in FIG. 3, program source file 350 is compiled to create an object file at block 345. Similarly, a library source file 305 is compiled to create a dynamic library at block 310. The resultant dynamic library object file 315 acts as input to import librarian 320 which operates on dynamic library object file 315 to generate import library stub file 325. The object files from compilation 345 are statically linked with the stub file 325 to create a dynamic binary executable 340.

As is shown in FIG. 3, dynamic linker 330 receives dynamic executable object file 340 and dynamic library object file 315 as input to generate a fully linked and bound executable file 335 (e.g., runnable process). In operation, a computing application (e.g., program source file 350) can call one or more functions from a cooperating dynamic linked library. When the function is called or when the program executes (as described above), dynamic linker 330 operates to dynamically locate the symbols found in memory representative of the function being called by the program application or those required for program execution.

Figure 4:
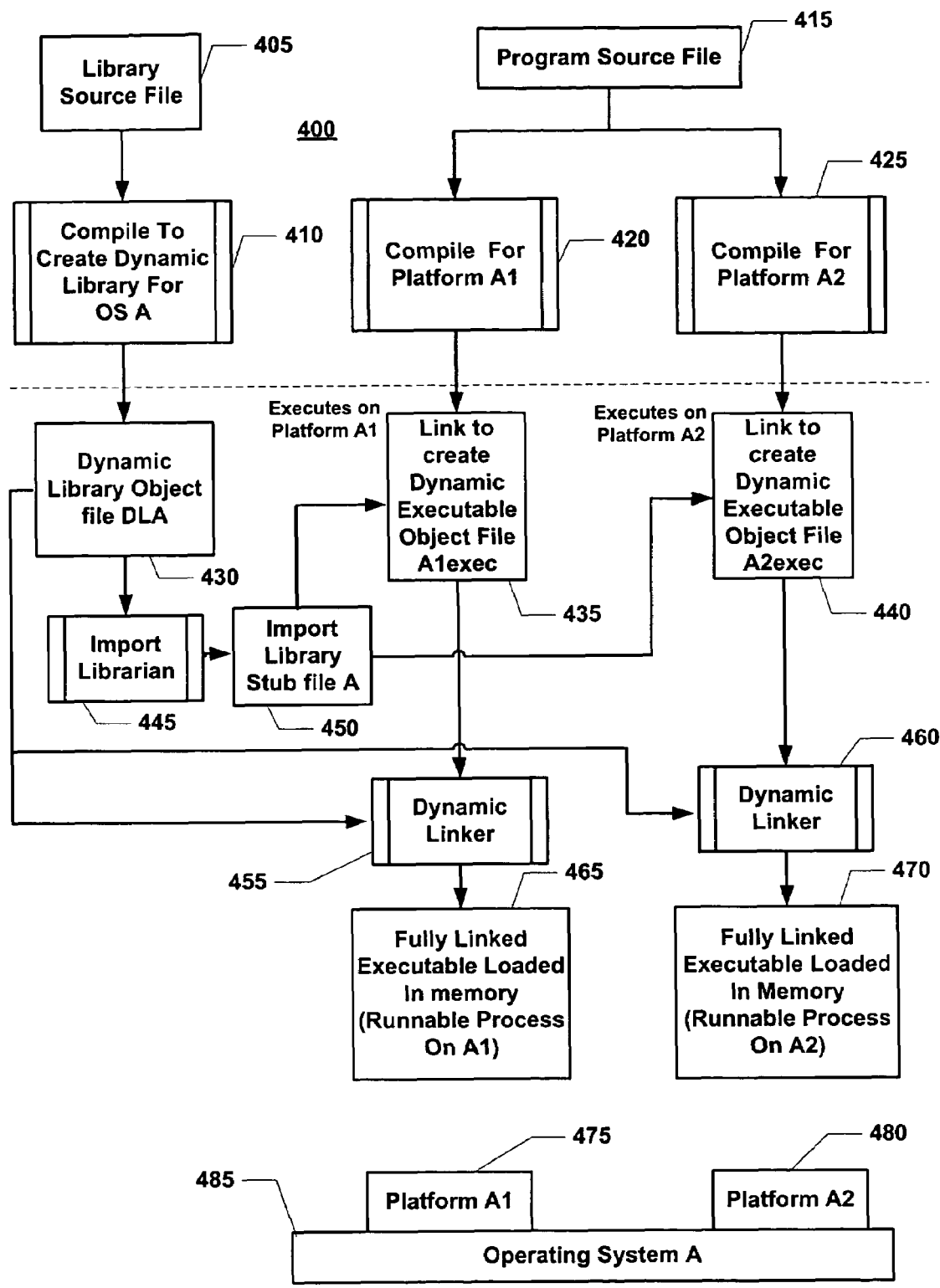
FIG. 4 is a block diagram of a dynamic linking architecture when linking the same library across a first operating system having disparate computing platforms.
Figure 5:
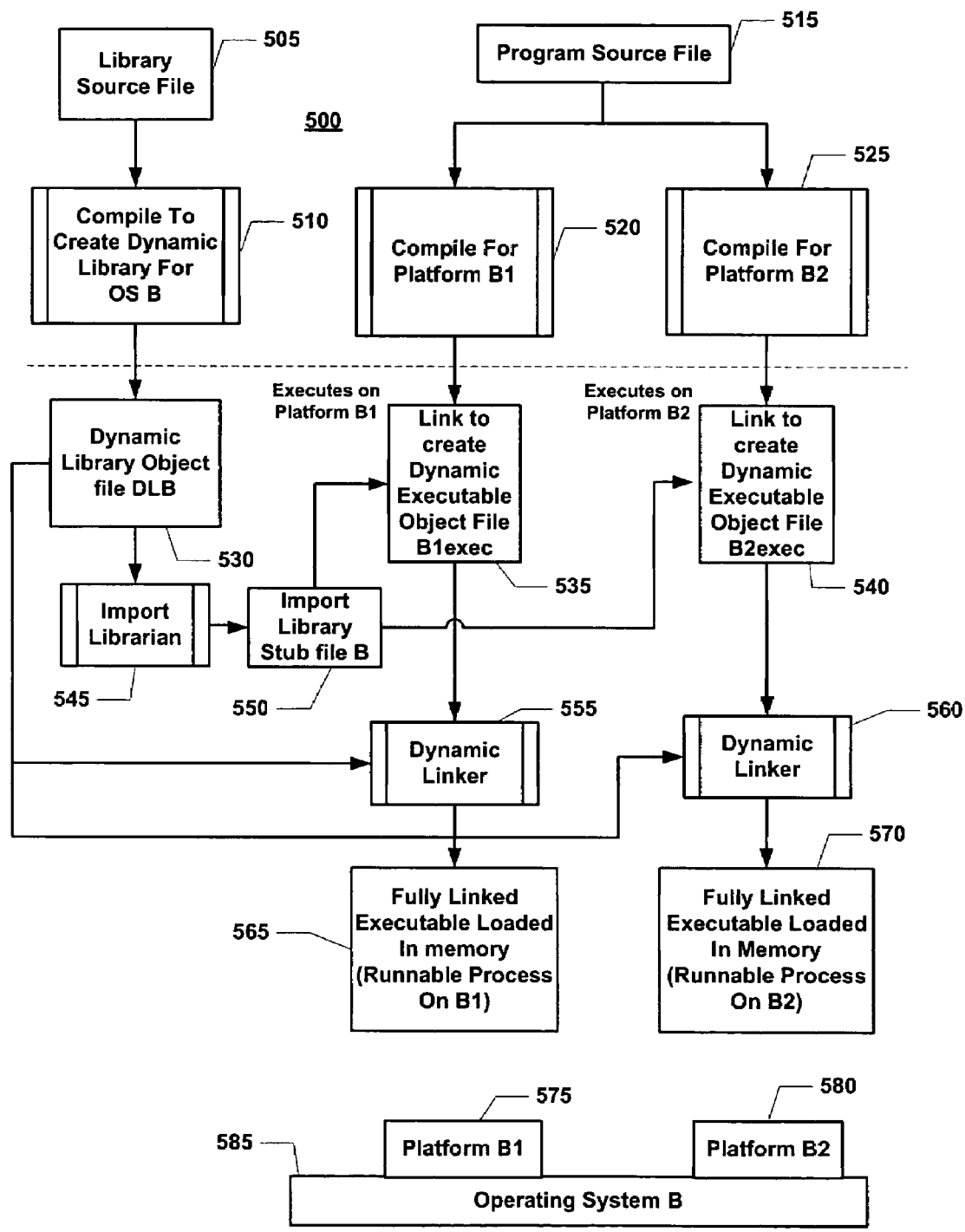
FIG. 5 is a block diagram of a dynamic linking architecture when linking the same library across a second operating system having disparate computing platforms.

FIGS. 4 and 5 describe how source code can be processed to run on multiple operating systems and platforms with conventional approaches. With reference to FIG. 4, where a single operating system A 485 supports two platforms A1 475 and A2 480, FIG. 4 shows exemplary dynamic linking architecture 400 having library source file 405 and program source file 415. Library source file 405 is compiled at block 410 to create a dynamic library for operating system A 485. The resulting dynamic library object file for dynamic library A 430 acts as input to import librarian 445 that processes the dynamic library object file for dynamic library A 430 to produce import library stub file A 450.

Likewise, program source file 415 is compiled at block 420 to create object file for platform A1 475, and is compiled at block 425 to create object file for platform A2 480. The object files resulting from compilation 420 are statically linked with stub file 450 to create the resulting dynamic executable object file A1exec 435 (e.g., executable on platform A1 475). Also, as is shown, the object files resulting from compilation 425 are statically linked with stub file 450 to create the resulting dynamic executable object file A2exec 440 (executable on platform A2 480). Dynamic linker 455 operates to link the dynamic library 430 with the dynamic executable object file A1exec 435 to create a fully linked executable 465 that is loaded into memory of operating system A 485 so to generate a runnable process on platform A1 475. Similarly, dynamic linker 460 operates to link dynamic library 430 with dynamic executable object file A2exec 440 to generate fully linked executable 470 that is loaded into memory of operating system A 485 so as to generate a runnable process on platform A2 480. In operation, either of the fully linked executables 465 or 470, respectively, can call functions or retrieve data from dynamic library 430.

With reference to FIG. 5, FIG. 5 shows exemplary dynamic linking architecture 500 having library source file 505 and program source file 515. Library source file 505 is compiled at block 510 to create a dynamic library for operating system B 585. The resulting dynamic library object file 530 for operating system B 585 acts as input to import librarian 545 that processes the dynamic library object file 530 to produce import library stub file B 550.

Likewise, program source file 515 is compiled at block 520 to create object file for platform B1 575, and is compiled at block 525 to create object file for platform B2 580. The object files resulting from compilation 520 are statically linked with stub file 550 to create resulting dynamic executable object file B1exec 535 (e.g., executable on platform B1 575). Also, as is shown, object files resulting from compilation 525 are statically linked with stub file 550 to create the resulting dynamic executable object file B2exec 540 (executable on platform B2 580). Dynamic linker 555 operates to link the dynamic library 530 with the dynamic executable object file B1exec 535 to create a fully linked executable 565 that is loaded into memory of operating system B 585 so to generate a runnable process on platform B1 575. Similarly, dynamic linker 560 operates to link dynamic library 530 with dynamic executable object file B2exec 540 to generate fully linked executable 570 that is loaded into memory of operating system B 585 so as to generate a runnable process on platform B2 580. In operation, either of the fully linked executables 565 or 570, respectively, can call functions or retrieve data from dynamic library 530.

As is shown in FIGS. 4 and 5, there is a common set of source code comprising an application program 415 and 515, respectively and a library file, 405 and 505, respectively. In an illustrative implementation, the application program can be written to run on four separate platforms, namely platforms A1 475 and A2 480 which are derived from a common operating system A 485, and platforms B1 575 and B2 580 derived from operating system B 585. The source code of the application 415 and 515 can maintain instructions which are specific to each of the platforms, platform A1 475, platform A2 480, platform B1 575 and platform B2 580, and can be written in a manner that the platform dependencies can be identified when the source code of the application 415 and 515 is compiled.

In the implementation provided, the source code for the library 405 and 505 generally does not maintain specific platform dependencies. In an illustrative operation, a library can be called by a cooperating application program and can operate as a dynamic library. As is shown in FIG. 4, each of the platforms (475 and 480) can require its own dynamic executable file A1exec 435, A2exec 440, that can be created by compiling the common application source file 415 through the platform specific compiler tools (e.g., compiler blocks 420 and 425). In the illustrative implementation, a cooperating dynamic library 430 can be created once and dynamically linked to both executables A1exec 435 or A2exec 440 to create a runnable process on each platform A1 475 and A2 480, respectively.

FIG. 5 shows that two additional executable files B1exec 535 and B2exec 540 are compiled to allow the application to run on platform B1 575 and platform B2 580. In addition, a new dynamic library 530 is created to link with executables B1exec 535 and B2exec 540, since the executable files, B1exec 535 and B2exec 540 are built for operating system B 585. In such implementation, to realize dynamic linking of a library across four platforms (platform A1 475, platform A2 480, platform B1 575, and platform B2 580) operating on two operating systems (operating system A 485, and operating system B 585, respectively) four dynamic executable files and two dynamic libraries are required to be built. It is appreciated that with conventional approaches, the development of binary objects operable on disparate computing environments can be resource intensive.

Figure 6:
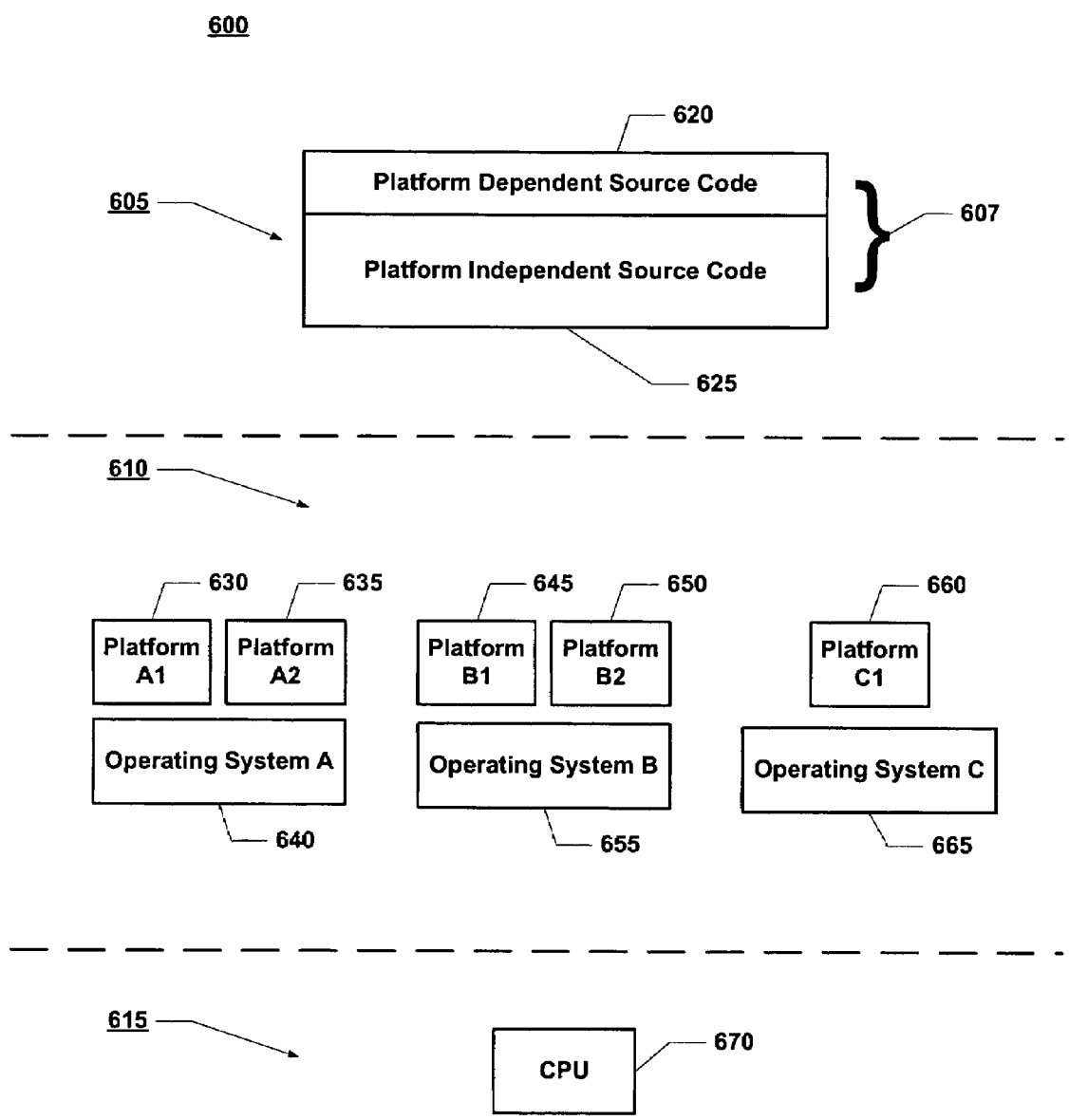
FIG. 6 is a block diagram of a plurality of operating systems supporting a plurality of platforms in accordance with the herein described systems and methods.

FIG. 6 shows the components of a exemplary computing environment 600. As is shown in FIG. 6, a hierarchy of layers 605, 610, and 615 between the source code 607 and the CPU 670 can exist. Such hierarchy shows a high degree of commonality at the top and bottom layers but proliferation in between. At the highest level 605, source code 607 is predominantly common to all cooperating platforms with some limited platform-specific elements 620. At the lowest level 615, the code runs on a CPU 670. In an illustrative implementation, when the CPU 670 architecture is common among a number of disparate computing environments (not shown), low level machine instructions are expected to be identical. However intermediate layers 610 can maintain multiple operating systems 640, 655, and 665, each with multiple platform variants 630, 635, 645, 650, and 660, and can require individual binaries due to their distinct characteristics and tool chains. Also as is shown, top layer 605 contains platform independent source code 625 that can be independent of both the platform and the operating system.

In an illustrative implementation, referencing FIG. 6, there are five platforms operating on three operating systems. Specifically, platform A1 630, platform A2 635 run on operating system A 640, platforms B1 645 and B2 650 run on operating system B 655, and platform C1 660 runs on operating system C 665. With conventional methods, five different versions of each application program (one for each platform) plus three separate dynamic libraries (one for each OS) would be required to be created to ensure proper operation of a computer program. The herein described systems and method aim to ameliorate the shortcomings of the conventional practices by providing a single dynamic library that works across the five platforms and two operating systems. In an illustrative implementation, a single set of binary libraries can be created that are usable on all systems that incorporate a specific CPU architecture, regardless of the OS running on the CPU, thus taking advantage of the commonality at the top 605 and bottom layers 615 of FIG. 6.

The herein described systems and methods can be applied to various computing environments. In an illustrative implementation, the herein described systems and methods might be applied to desktop systems, which generally contain a processor from the INTEL® x86 family. Common operating systems on desktop PCs are MICROSOFT® WINDOWS® and Linux, which both have dynamic linking functionality. These operating systems, however, employ incompatible formats for their binary objects so that separate libraries are provided for Linux and WINDOWS® even though they can run on the same CPU.

In the context of mobile and embedded devices, the proliferation problem can be significantly greater. Specifically, mobile and embedded devices leverage a far greater number of operating systems, including but not limited to, Linux, WINDOWS® CE, PalmOS®, SymbianOS®, BREW®, Itron. At the CPU level 615, however, there can be considerable commonality based on a selected computer hardware architecture, such as the ARM RISC architecture. Current practices do not exploit such commonality, instead creating libraries that are tailored according to the OS or platform layer (e.g., 610).

In an illustrative implementation, the herein described systems and methods can be applied to a selected computing environment market (e.g., a mobile device market) to distribute a single software library that can run on the computing environments operating on a selected hardware architecture (e.g., devices containing an ARM processor) irrespective of the software platform. Such approach can offer various commercial benefits to both software developers and customers, including but not limited to, reduced cost of developing and maintaining multiple versions of platform-specific libraries. Additionally, code quality can be established more rapidly through the cumulative experience with an identical component across multiple installations. Further, changes to libraries can be more thoroughly and efficiently tested with such approach. Device makers (e.g., cellular phone manufacturers) can employ a common library across their various product ranges if such library is proven on a single product range.

Figure 7:
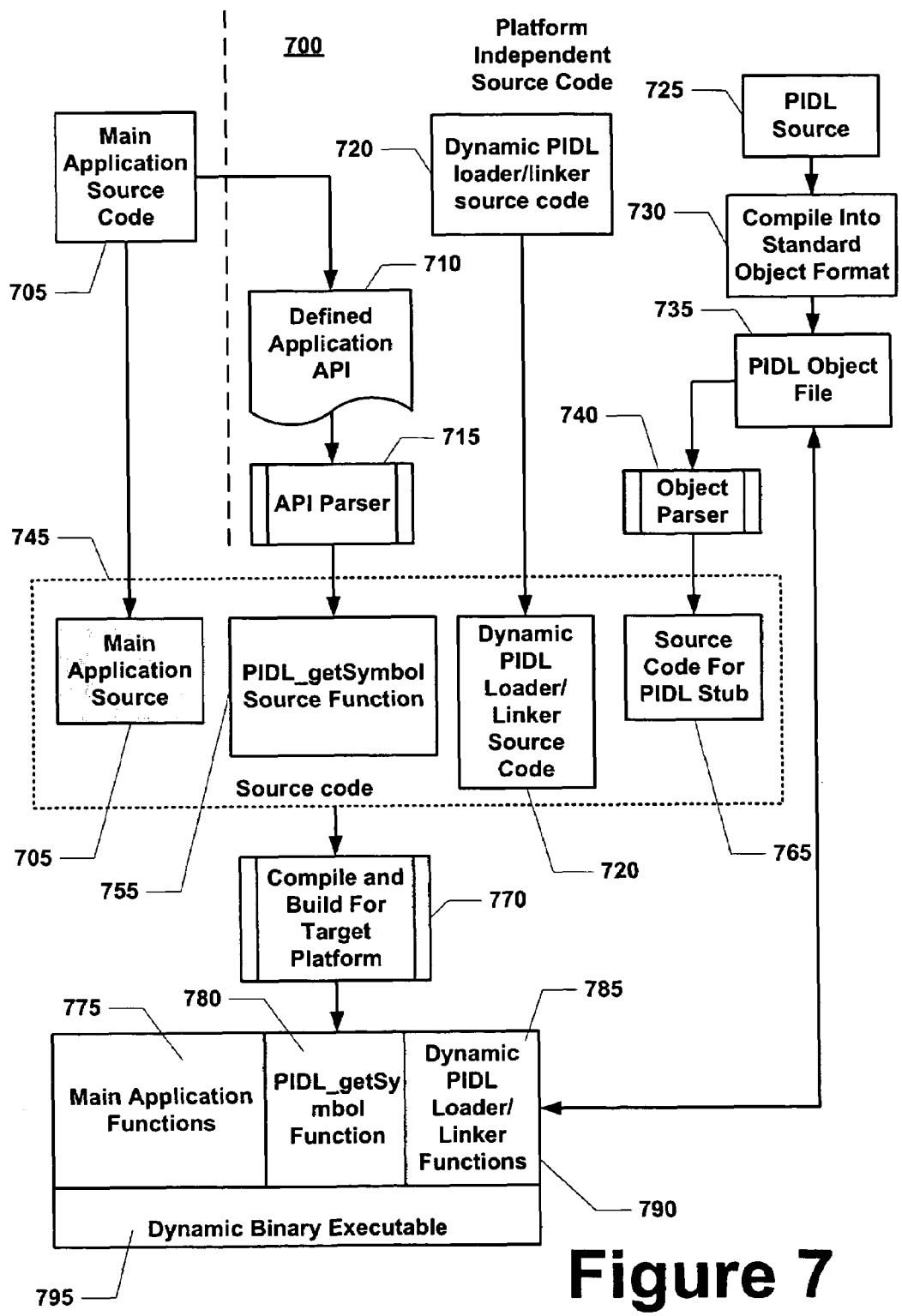
FIG. 7 is a block diagram showing the interaction between exemplary components of an illustrative platform independent linking architecture in accordance with the herein described systems and methods.

FIG. 7 shows exemplary platform independent binary object and linking architecture 700. As is shown, platform independent binary object and linking architecture 700 comprises source code that includes main application source code 705, and platform independent source code components, that include but is not limited to, platform independent dynamic library (PIDL) source 725; compiler 730, PIDL object file 735, object parser 740, source code for PIDL stub file 765, source code for PIDL dynamic loader/linker 720, defined application program interface (API) 710, and API parser 715.

In an illustrative operation, PIDL source 725 is compiled into standard object format at block 730 which creates PIDL object file 735. The PIDL object file can then be parsed by object parser 740 to generate source code for PIDL stub file 765. Similarly, application program interface (API) parser 715 may operate on API 710 to generate a PIDL_getSymbol function to allow a cooperating main application 705 access by the PIDL object file 735. As is shown in FIG. 7, the main application source 705, source code for dynamic loader/linker 720, source code for PIDL stub file 765, and if being executed, the PIDL_getSymbol Source function 755 (e.g., the set of compiling components source code 745) are compiled and built for a target platform at step 770. The resulting dynamic binary executable 795 leverages main application function 775, the PIDL_getSymbol function 780, and dynamic PIDL loader/linker functions 785 to call functions and retrieve data from PIDL object file 735.

It is appreciated that although exemplary platform independent binary object and linking architecture 700 is shown to have various components in a particular configuration and described to perform specific operations that such description is merely illustrative as the inventive concepts described herein can be applied to any platform independent binary object and linking architecture having various components, configurations, and operations.

In an illustrative implementation, exemplary platform independent binary object and linking architecture 700 can operate according to the following method. PIDL object file 735 can be created in a standard object file format whose structure is well defined. Object parser 740 can operate to parse the standard PIDL object structure to create a stub file 765. Stub file 765 is generated as source code. Moreover, the source code for stub file 765 has no platform dependencies. Dynamic loader/linker 720 can be written so that it can be included as part of main application program 705. Additionally, API 710, an interface by which PIDL libraries can call a main application, can be specified and converted into a source code function (PIDL_getSymbol) 755 for compilation with the main application 705. In the implementation provided, if the target platform is known, the combined source code (e.g., the set of compiling components source code 745) can be compiled into a binary executable 795 for a given platform (not shown). At run time, dynamic loader/linker 785 (e.g., compiled loader/linker) can handle symbol resolution and relocation to bind dynamic binary executable 795 and PIDL file 735 as a fully runnable process.

As described, platform independence of the dynamic library can be achieved firstly by compiling the library source 725 code into a known object file format 735. In the contemplated implementation, PIDL source 725 does not contain any dependencies on a specific platform. An object file format (not shown) can typically contain several types of information, including but not limited to, header information such as the size of the code, object code generated by the compiler or assembler, relocation information for use by a linker 785—when the addresses of object code are juggled by the linker, and symbol tables of symbols to be exported from this module or imported from other modules.

In an illustrative implementation, platform independent binary object and linking architecture 700 can leverage various object file formats including but not limited to, ELF (Executable and Linking Format), MICROSOFT® Portable Executable (PE) format, and other object formats (e.g., an object format designed specifically for the herein described systems and methods).

Conventionally, different operating systems and platforms use different object file formats. The linkers and loaders for these platforms expect to receive linkable objects in these pre-defined formats, and will reject other formats. When the platform also provides dynamic linking, the dynamic linker is part of the operating system and can be "hard wired" to a unique object format.

The herein described systems and methods ameliorate this shortcoming by providing a generic loader/linker 720. In an illustrative implementation, the generic loader/linker 720 can be written to process object files in a selected object file format (e.g., ELF, or whatever other object format that is selected). In operation, the generic loader/linker 785 operates to locate the symbols, relocation information, and other information within a PIDL object file 735. As is shown in FIG. 7, the deployment of the loader/linker 720 can be accomplished through the creation of source code that is compiled with the source code of a cooperating main application 705. In this context, the linking and loading control is removed from the operating system and contained in the running executable. The dynamic loader/linker 785 also can operate to process non-PIDL libraries. In this context, dynamic loader/linker 785 can be designed to ascertain whether a dynamic library is a PIDL or non-PIDL type, and process the PIDL or non-PIDL library accordingly. In an illustrative implementation, when a non-PIDL library is being processed, control of linking and loading can be passed back to an underlying operating system.

In an illustrative implementation, the PIDL object file can be employed across disparate platforms without the need for rebuilding or recompiling. In this implementation, since the main application program is compiled together with the dynamic linker/loader code for a chosen platform, and since control of the linking is not dependent on the platform and, instead, placed within the executable, the linking of the PIDL at run time can be achieved on disparate platforms without the need to re-compile or re-generate the PIDL object.

As is shown in FIG. 7, stub file 765 is created as source code. In comparison with conventional practices, with reference to FIG. 3, the conventional approach is to produce a library stub as an object file 325 that defines both the exported and imported global symbols. In operation, the stub file is generally small, and it allows the linker to resolve symbols in the combined/assembled program. In operation, the main program can call named functions that exist in the dynamic library, and the dynamic library can also call functions in the main program. For the combination to work correctly, the function calls can be resolved and relocated with the proper addresses once the loader has placed all the object code components into memory of a computing environment.

Figure 8:
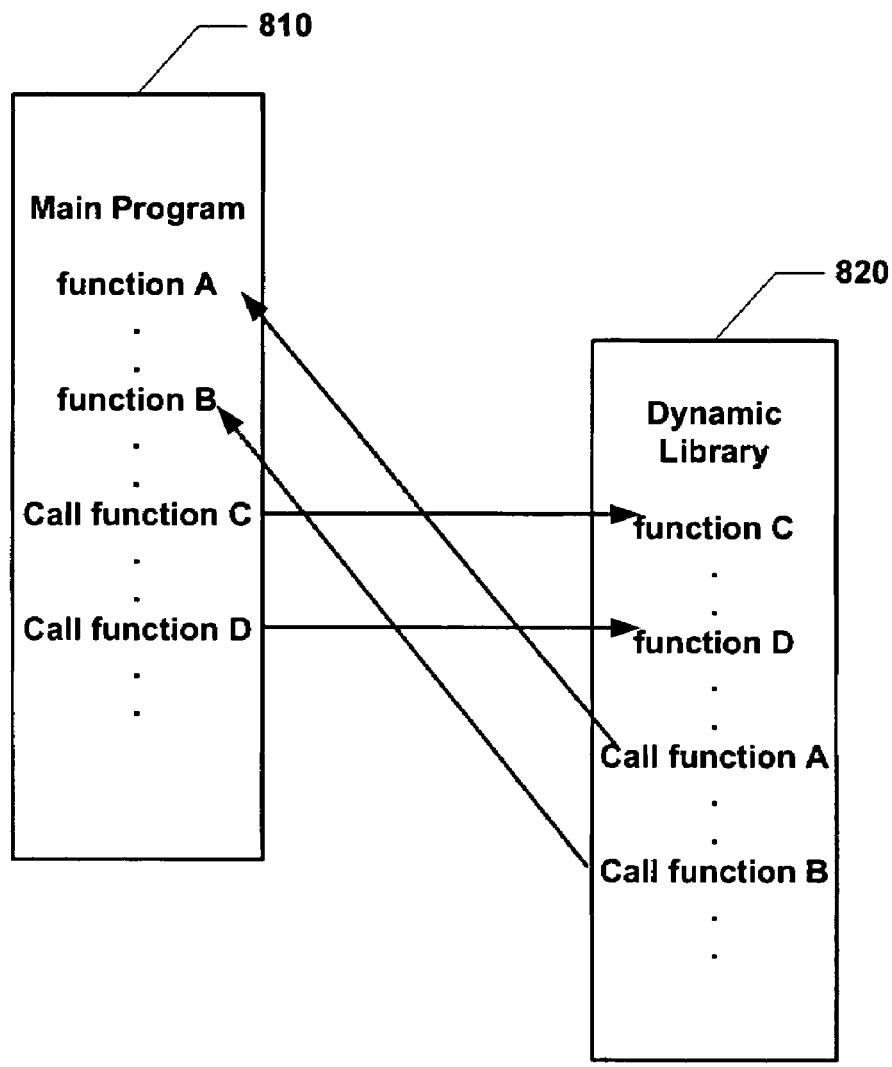
FIG. 8 is a block diagram showing the interaction between a main application program and dynamic library in accordance with the herein described systems and methods.

As is shown in FIG. 8, code for functions or symbols A and B can be located in the main program 810, and functions C, D can be located in dynamic library 820. In an illustrative implementation, in order for dynamic library 820 to call A and B, or main program 810 to use library functions C or D, the symbols and location of all the functions are resolved in the combined program. In the illustrative implementation, this operation can be performed by an exemplary linker (not shown). With conventional practices, a stub library (e.g., 325 of FIG. 3) can hold the information needed to bind the functions exported (e.g., C and D) from the library and those functions called by it (e.g., A,B). It is appreciated, with reference to FIG. 3, that with conventional practices, architecture 300 links the library stub 325 to the pre-compiled object files of the main program in a static linking stage to create binary executable 340. Later, when the binary executable is loaded for execution, it is able to dynamically link with dynamic library 315 under control of the dynamic linker 330. With conventional approaches, the dynamic linker is generally part of an operating system. In such context, since different systems use their own linkers and object formats, what results is a platform dependent library stub file. As such, a single library requires different stub files for different operating systems.

The herein described systems and methods aim to ameliorate the shortcomings of existing practices by providing a stub file as source code files. With reference to FIG. 7, stub library 765 is created using object parser 740. Object parser 740 parses through the PIDL object file 735 to extract the symbol names and properties, and creates a source file 765 (e.g., in a high level language including but not limited to, "C" language or equivalent) as the output of the parser. In an illustrative implementation, and as shown in FIG. 7, the generated source code for PIDL stub file 765 is platform independent and can be subsequently compiled as part of the main application program (along with the dynamic linker code). By including the PIDL stub information at the compile stage, the symbols exported from the PIDL can be declared in a resulting dynamic executable.

It is appreciated that creating the stub file as source code rather than object code, as with conventional approaches, indicates that the library information contained in the stub is to be included at the compilation stage of the build process. By contrast, conventional approaches incorporate the stub at the static linking stage, after the main application has already been compiled. The static linker is under control of the operating system, which requires the linked objects to be in an object format that is specific to the operating system, which format generally is not recognized by the linker of a different operating system. To achieve a platform independent solution, the reliance on the linking stage is required to be removed. With the herein described systems and methods, such goal can be achieved by providing the stub file as source code to be compiled rather than object code to be linked.

It is appreciated that the herein described systems and methods allow a main application access to dynamic libraries deployed as PIDL objects given that the main application is compiled with the dynamic linker and the appropriate PIDL stub files. The herein described systems and methods also account for the instance when the PIDL requires access to functionality in the main application (as described in FIG. 8). In such context, an API (710 of FIG. 7) (Application Programming Interface) of functionality exposed by the main application to the PIDL libraries can be first specified and published (so that the PIDL can employ the exposed functions). The API (710 of FIG. 7) can then be parsed to generate a source code function PIDL_getSymbol (755 of FIG. 7) which can be compiled as part of the main application (as described in FIG. 7). In an illustrative implementation, the PIDL_getSymbol function can return the address of a named symbol exposed by the API, and can be used by the dynamic linker during relocation to substitute addresses of the symbols called by the PIDL. As such, when a PIDL calls a function within the main application, linkages and addresses have already been resolved by the dynamic linker (785 of FIG. 7).

Furthermore, the dynamic linker can allow run time linking of the PIDL objects. The main application source files can be compiled for the target platform, as shown in FIG. 7, to produce a binary executable containing the dynamic linker and PIDL_getSymbol functions as well as the main program. The PIDL libraries can be created and are available as object files.

In an illustrative operation of an illustrative implementation, when the main program starts running, it can be placed in memory by a platform loader. As execution begins, the main program determines whether it makes a call to a symbol which is external to itself. Such call can invoke the PIDL linker, which first determines the name and path of the library containing the called function. If the library is a regular platform specific dynamic library like a WINDOWS® DLL (and not a PIDL), the linker passes control to the regular platform library loader, when one exists. If instead, however, the called function is within a PIDL, it can be identified by symbol name using the PIDL stub file which contains the symbols it exposes and which has been compiled into the main program so the symbol references are defined.

The linker, responsive to the function call, can create a programmed structure to represent the PIDL object. It then can interrogate the object to find the code size (e.g., defined in a field within the object file format so readily available), can allocate a fixed block of memory of the appropriate size, and can load the PIDL file into the allocated memory.

The linker then operates to relocate the symbol addresses in memory. The internal symbols within the PIDL are relocated. In operation, a binary file contains the address of the symbol within the object code, but generally operates under the assumption that there is a base starting address of zero for the library code. The PIDL, however, is loaded at a different address, which can be ascertained since the PIDL is loaded into memory. Relocation by the linker can involve adjustment of the symbol addresses to account for the actual starting address of the memory block.

After relocating the internal PIDL symbols, the linker can then relocate all of the symbols called by the PIDL that are external to it such as functions contained in the main application. For these symbols, the linker can call the PIDL_getSymbol function, with the name of the external symbol to be relocated as the argument. Since this function contains a list of all symbols exposed by the application API, it is able to match the name and return the actual address of the named symbol.

At this stage, the PIDL maintains the correct addresses of the internal and external symbols it exports or imports. After the relocation is complete, the relocated addresses of the symbols that are exported by the PIDL can be passed back to the linker. The main program has access to the relocated symbols such that when a call is made from outside the PIDL to one of the PIDL symbols, the correct symbol address is used.

The herein described systems and methods can be employed with several libraries (e.g., PIDLs) linked to a single application. These libraries can make calls from one to another, using the functions and symbols they export. With multiple libraries in use, the linking mechanism can be applied homogenously—i.e., the dynamic library is saved in a standard object format, a stub is generated in source format, and the main program is compiled with the stubs for the PIDL libraries it uses. The dynamic loader/linker loads each library at load time or at run time as it is called, and the information to perform relocation and resolve symbols between PIDL libraries and with the main program is handled by the dynamic loader/linker (e.g., 785 of FIG. 7) compiled into the program.

Figure 9:
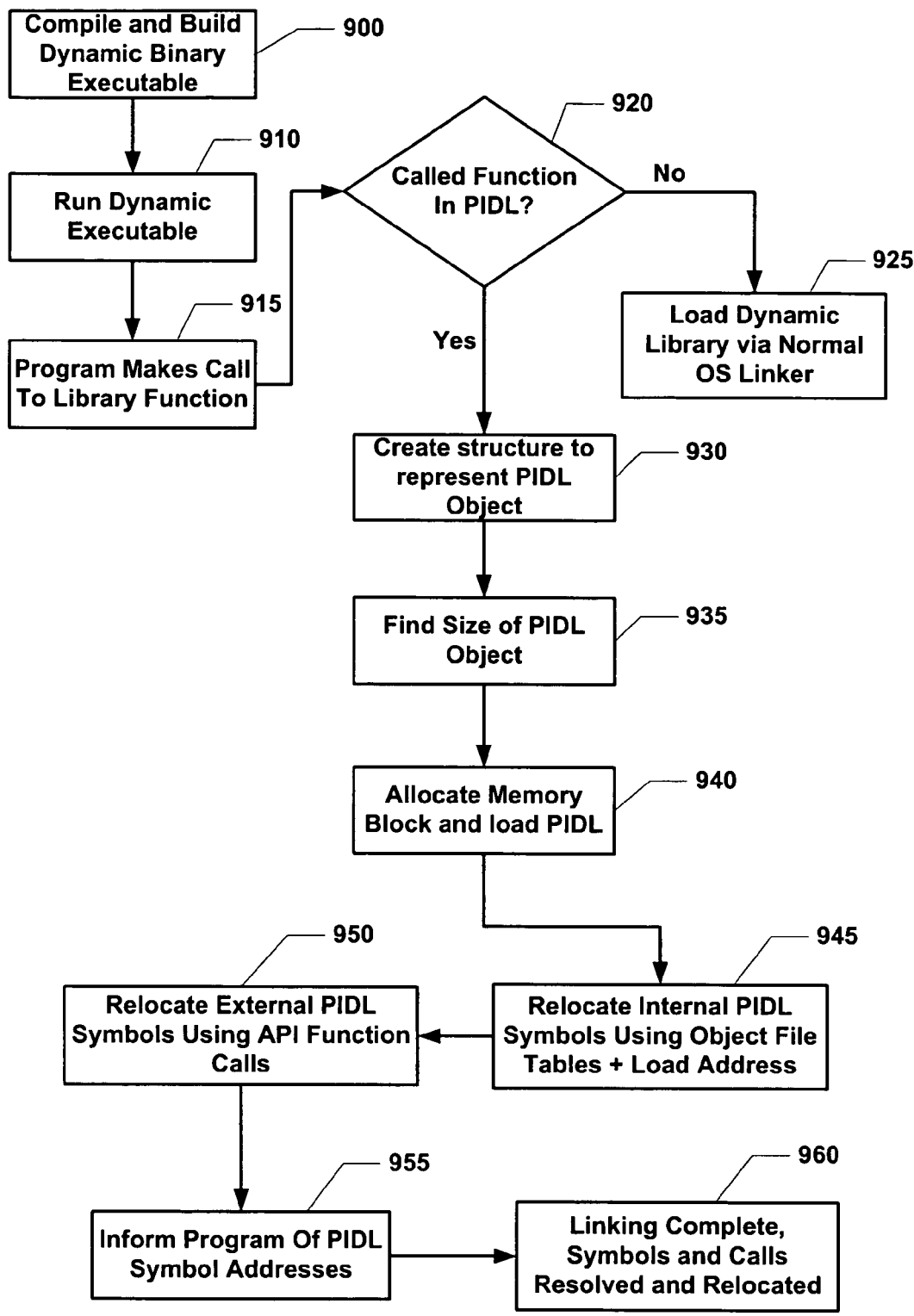
FIG. 9 is a flowchart diagram showing the processing performed by an illustrative platform independent linking architecture in accordance with the herein described systems and methods.

Platform Independent Dynamic Library:

FIG. 9 shows the processing performed by an exemplary computing environment when performing run time linking of one or more PIDLs. As is shown processing begins at block 900 where the dynamic binary executable is compiled and built (as is described in FIG. 7, an exemplary dynamic binary executable can include but is not limited to compiled main application source code, source code for a PIDL loader/linker, and PIDL stub source code). From there processing proceeds to block 910 where the dynamic executable is run on the exemplary computing environment. Processing then proceeds to block 915 where it is determined that a cooperating computer program makes a call to a library function. A check is then performed at block 920 to determine if the called function is in a cooperating PIDL. If the check at block 920 indicates that the called function is not in a cooperating PIDL, processing proceeds to block 925 where the cooperating dynamic library is loaded through a normal operating system/platform linker. Processing then terminates.

However, if at block 920 it is determined that the called function is in a cooperating PIDL, processing proceeds to block 930 where a programmed structure for the PIDL object is created so that the information in the PIDL object file, with its predetermined file format, can be interrogated. The size of the PIDL object is then determined at block 935, From there, processing proceeds to block 940 where a memory block is allocated, and the PIDL object file can be loaded into the allocated block. The internal symbols of the PIDL are then relocated at block 945 using symbol tables and load addresses extracted from the object file. The external PIDL symbols are then relocated using API (PIDL_getSymbol) function calls at block 950. From there, the cooperating computer program is informed by the PIDL linker of PIDL symbol addresses at block 955. From there, linking is deemed complete as the symbols and calls are resolved and relocated at block 960. Processing then terminates.

Mechanism For Dynamic Linking In Constrained Environment:

Some operating systems do not provide a dynamic linking capability. When libraries are used on these systems, the libraries are statically linked—i.e., the libraries can be bound to executable binaries at link time. The executable can also be static as it can be ready for execution without additional linking and, moreover, may not change after linking is complete. Generally, a static linked library can not change without impacting (e.g., breaking or stopping) the underlying programs to which it is bound. Also, since the addresses of routines and data in the library are bound into the program, changes in these addresses will cause the bound program to malfunction.

The herein described systems and methods ameliorate the shortcomings of existing practices by providing dynamic execution on operating systems that do not natively support dynamic execution. In an illustrative implementation, dynamic linking can be considered the ability to defer linking until run time or load time, or the ability for an executable program to use libraries to which it is not statically linked. Additionally, the herein described systems and methods allow the linking of binary object formats that are not natively supported by a given operating system.

In an illustrative implementation, a large program may be partitioned into a main application plus a set component libraries that provide the supporting functionality. With conventional practices, the program, on the whole, would be provided as a single static executable. As such, if changes to the program are needed, an entire new executable would be built and distributed to replace the unmodified version. In contrast, in an illustrative implementation, the components can be supplied, once, independently of the application that uses them. As such, the application can be of smaller size and if a new or modified application is required, only the application, itself, would be required to be rebuilt without requiring the rebuilding of the associated libraries.

Conversely, in the implementation provided, if the application remains unchanged but one of the components changes, the new component can be substituted in the place of the earlier version without change to other components. Provided the symbol names of the revised version are the same, the new component version can be linked to the original application program and other components at run time. In an illustrative implementation, the dynamic linker takes care of the address relocation. In the case the symbols are at different addresses in the new component version, the addresses can still be resolved and relocated at run time.

Figure 10:
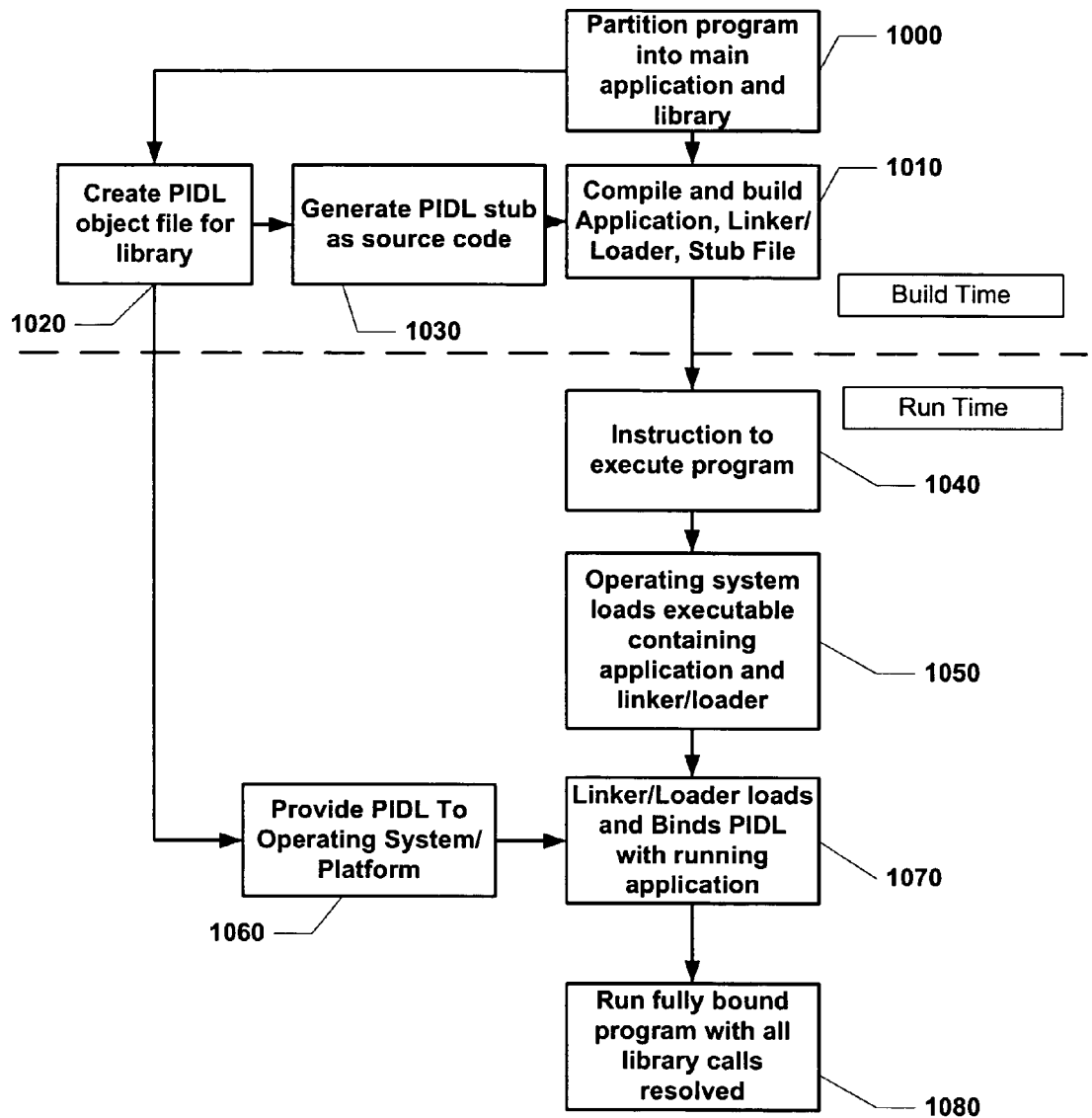
FIG. 10 is a flowchart diagram showing the processing performed when employing a platform independent binary object in an computing environment that does not have a native facility to perform dynamic linking.

FIG. 10 shows the processing performed when deploying a PIDL on a computing environment not supporting dynamic execution. As is shown in FIG. 10, processing begins at block 1000 where a program is partitioned into a main application and one or more libraries, intended for run-time deployment as dynamic libraries. The library can then be compiled at block 1020 into a PIDL object file having a known standard file format. A stub file comprising platform independent source code can be generated at block 1030 in the manner previously described by parsing the PIDL object file. The stub file can be compiled together with the source code for the main application, and source code for a dynamic linker loader, at block 1010. The linker/loader component has functionality as previously described to interpret PIDL object files in the known standard file format, can load them in memory, and can perform the necessary linking operations to resolve and relocate symbols between the library and a cooperating application.

All of the functions and/or operations performed at blocks 1000-1030, described above, can be performed at build time, that is prior to deployment and execution of the program. In a constrained environment that does not natively support dynamic linking, subsequent co-operation or interaction between the built executable and external libraries is generally not achievable. The illustrative implementation, by contrast, provides additional blocks 1040 to 1080 to provide dynamic operation at run time. The built executable can be instructed to begin execution at block 1040, and can load into memory as normal under control of the native operating system at block 1050. The dynamic linker/loader, contained within the executable as a result of block 1010, can operate to load and bind the PIDL library with the running application. (See FIG. 9 blocks 915 to 960). The resulting program, fully bound with all library calls resolved can then run at block 1080.

It is appreciated that although the dynamic linking operation in a constrained environment is shown to operate in a manner wherein the libraries are platform independent such description is merely exemplary as the inventive concepts described herein can be applied to libraries having platform dependence.

Code Components Mechanism:

Certain operating systems (OS) used in mobile computers (e.g., such as PalmOS, SymbianOS) enforce constraints on the use of global variables and static writeable variables. Such constraint can be present so that the operating system can avoid fully handling code relocation and address management of global variables. Because static variables are held in the same segment of memory as global variables, writeable static variables may also be prohibited by the operating system. When computer program code is written with such an operating system in mind, it is of course possible to follow the constraints and produce compatible code. However, when a piece of code such as a library has been written for a different platform without such constraints, the code may contain violations of the rules to the extent that it will even compile or build on the constrained operating system. This creates a restriction on the ability to use third party libraries and pre-written code on some operating systems, thereby reducing their flexibility. It makes for less productive development, because time has to be spent modifying existing code to obey the operating system constraints, or in some cases totally re-writing it from scratch.

The herein described systems and methods allow operating system constraints to be side-stepped. In an illustrative implementation, a library whose source code violates the constraints of an operating system can be compiled and built into a PIDL format. The PIDL library can then be combined with an application program and run on the constrained operating system. The unique dynamic loading and linking mechanism of the herein described systems and methods allocates a memory block for the PIDL. Furthermore, in this implementation, the global variables are not treated as global beyond the memory area of the PIDL.

As such, in this implementation, the global variables defined within the library can be confined within this memory block and are not visible to the operating system as global variables. Static variables can also be confined to the allocated memory block and do not rely on operating system intervention. What results is a side-stepping of an operating system's inability to relocate such global and static variables. In this implementation, a PIDL loader/linker can perform the relocation of the library variables to render them functional.

Figure 11:
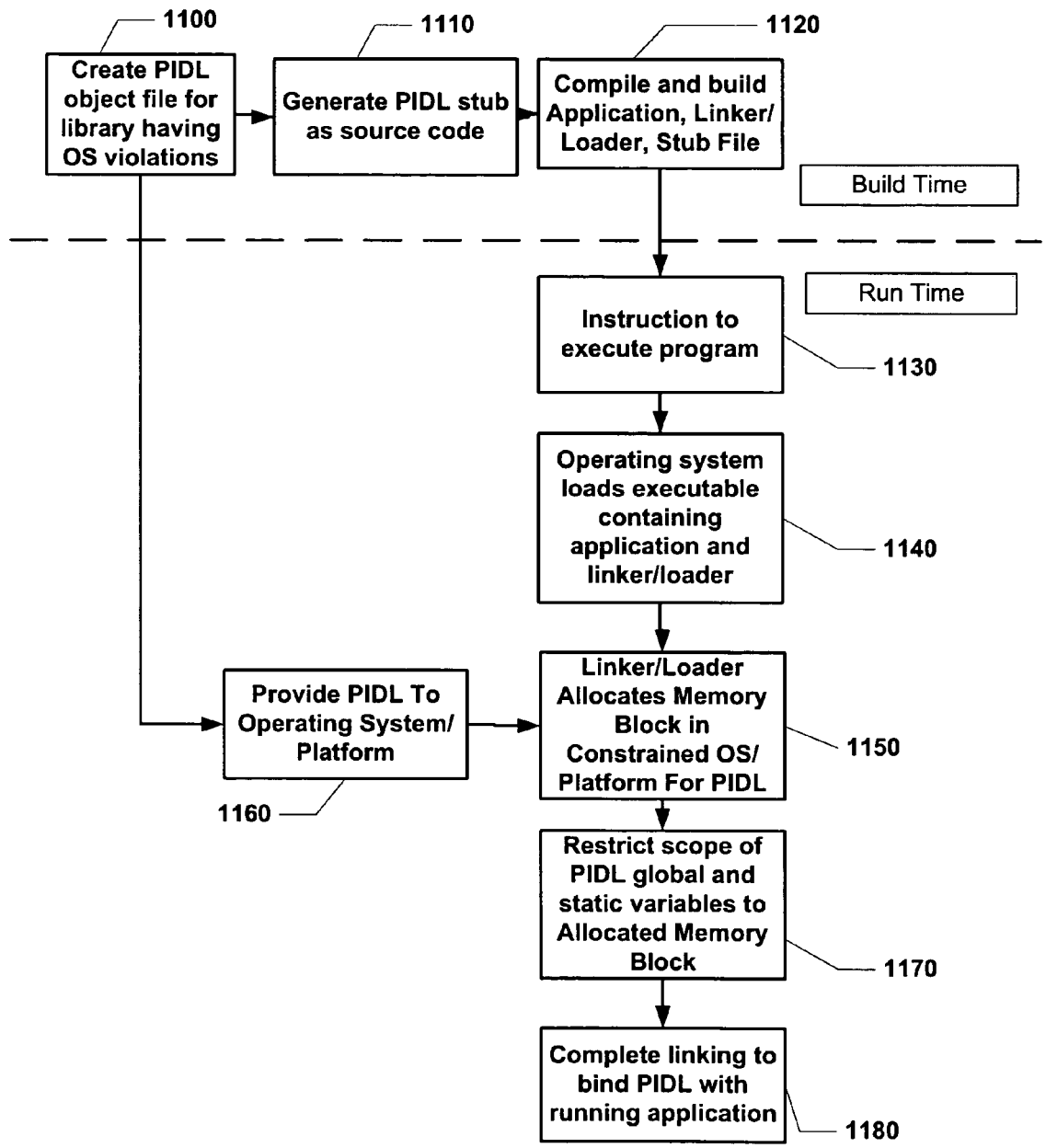
FIG. 11 is a flowchart diagram showing the processing performed when employing a platform independent binary object in a constrained computing environment.

FIG. 11 shows the processing performed by a constrained computing environment to handle a PIDL such that the PIDL can side-step one or more constraints of the computing environment. As is shown in FIG. 11, processing begins at block 1100 where a PIDL can be created from a library whose code violates one or more constraints imposed by the operating system. A stub file, comprising source code, can be generated as previously described at block 1110, and at block 1120 the stub file can be compiled and built together with a dynamic linker loader and a computing application that cooperates with the library.

In an illustrative implementation, at run time, an instruction to execute the application program can be received at block 1130. The executable can be loaded as normal by the host computing environment at block 1140. The PIDL can be provided for use by the computing environment at block 1160. On identifying the dependence between the application program and the library, the dynamic linker/loader (built into the program at block 1120) can allocate a memory block at block 1150 and loads the PIDL into the allocated block. As shown at block 1170, the global and writeable static variables defined in the library have their scope restricted to the allocated memory block and are not accessible by name from beyond this memory block. They can be available to all of the library functions because these can also reside within the allocated memory block, so that the library operates correctly within the computing environment even though it violates constraints imposed under conventional operation of the environment. Linking of the PIDL is then completed at block 1180 to produce a fully bound runnable process.

It is appreciated that although the code components feature is shown to operate in a manner wherein the libraries are platform independent that such description is merely exemplary as the inventive concepts described herein can be applied to libraries having platform dependence.

Code Loading Mechanism:

With conventional software development, an object oriented approach can be taken. Rather than call a function to perform a specific task, an object can be created and a method of the object can be called to perform a desired task. Such approach can be beneficial as several such objects can be created, and several tasks can be active simultaneously. There are many situations where it would be beneficial to execute multiple instances of a computational task. For example, the case where a library exists to play and render a movie clip within a document. When such a document contains two such movie clips, it is convenient to play them simultaneously by running two instances of a common code object. In the absence of an object oriented approach, a developer may encounter the situation where an object performs a task successfully, but encounter difficulty in allowing several of the same objects to execute concurrently.

Although a developer can choose to write in an object oriented style, such choice may be nullified when integrating third-party code. In particular this applies to code deployed as a library, where the library manipulates data and contains access functions to this data. In an illustrative example, non object-oriented code can employ global variables, and one time initializations of static variables. In such context, in certain computing environments, this prevents the computing environment from running more than one invocation of a library object within the same process, because a single process may keep only one set of the data employed by the module or library. Specifically, two invocations of the same object could interact badly with each other through their shared use of named global variables. Alternatively, a library may be written in a way that it can be executed once, but even when that execution completes, an attempt to execute a second time will fail because statically initialized variables no longer have the necessary initial values. This is because static variables are initialized at build time, by the compiler, and not at run time, so if an initialized variable is changed during execution, a subsequent execution retains the changed value and starts with a value different from the initialized value needed for proper operation.

The herein described systems and methods aim to ameliorate these shortcomings by providing the PIDL loading mechanism described above. The restriction to use a single set of data within a process is removed, by allowing multiple instances of the PIDL to utilize their own "private" copies of the data within a confined memory block, thus circumventing the interactions and conflicts that cause malfunctions in the conventional approach. This method allows multiple instances and repeat execution even within the same process. It also opens the possibility for multiple concurrent execution on an environment that does not allow multiple processes. In an illustrative implementation, the PIDL treats global variables as addresses within a dynamically allocated buffer. A single PIDL can be loaded multiple times, and then each copy will have its own individual and independent copies of global variables, thereby avoiding problematic interactions. Similarly, each time a library is to be executed, a copy is loaded from file hence it contains the correctly initialized value of static variables.

Figure 12:
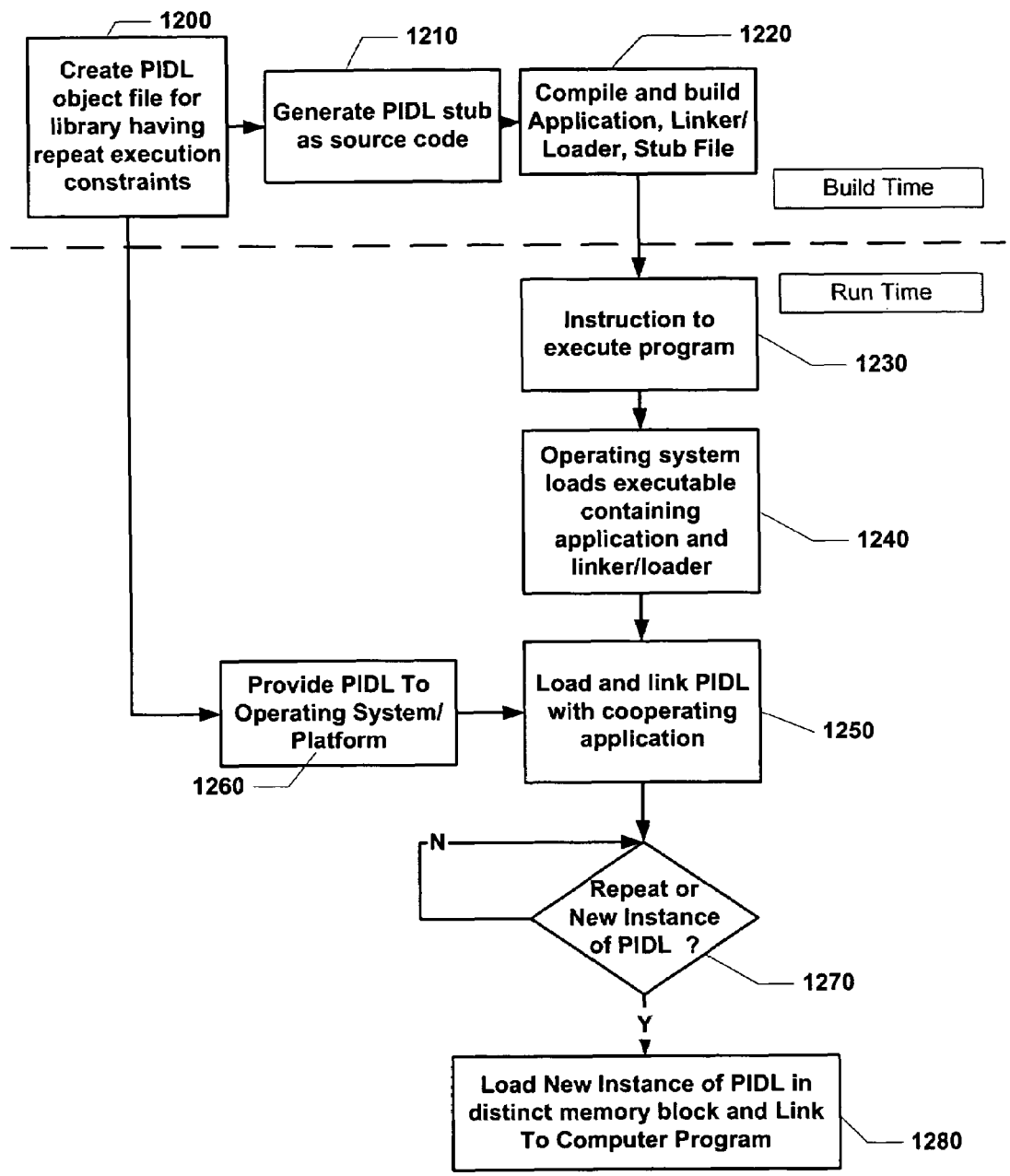
FIG. 12 is a flowchart diagram showing the processing performed when employing a platform independent binary object to run various instances of a cooperating computing application in a constrained computing environment.

FIG. 12 shows the processing performed by an exemplary computing environment, in an illustrative implementation, when handling a PIDL such that the PIDL can be employed to avoid problematic interactions of constrained code components. Processing begins at block 1200 where a PIDL can be created from a library whose code violates one or more constraints that inhibit repeat execution. A stub file, comprising source code, can be generated as previously described at block 1210, and at block 1220 the stub file can be compiled and built together with a dynamic linker loader and a computing application that cooperates with the library.

In the illustrative implementation, at run time, an instruction to execute the application program can be received at block 1230. The executable can be loaded by the host computing environment at block 1240. The PIDL can be provided for use by the computing environment at block 1260. On identifying the dependence between the application program and the library, the dynamic linker/loader (built into the program at block 1220) can allocate a memory block at block 1250, can load the PIDL into the allocated block and can link the PIDL with the cooperating application. A check can then be performed at block 1270 to determine if a new instance of a PIDL is to be loaded onto the computing environment. If the check at block 1270 indicates that a new instance of the PIDL is to be loaded, processing can then proceed to block 1280 where a new instance of the PIDL can be loaded in a distinct memory block and can be linked to the computer program. However, if at block 1270 it is determined that a new instance of PIDL is not to be loaded, processing reverts to the input of block 1270 and proceeds from there.

It is appreciated that although the code loading feature is shown to operate in a manner wherein the libraries are platform independent that such description is merely exemplary as the inventive concepts described herein can be applied to libraries having platform dependence.

Extensible Run Time Environment for Closed or Constrained Platforms:

Some computing devices operate as a closed computing environment, such that the device may only execute those programs and applications that are resident when the device is shipped from a device manufacturer or supplier. Such devices (e.g., mobile wireless devices) can contain an operating system that hosts the resident programs, but other applications cannot be added without restriction, even when the application is created for the host operating system. An example of such a closed platform is the large category of mobile handsets known as Feature Phones, which are provided with a fixed set of features (such as camera functions) in addition to voice, but these features are fixed and may not be extended by the user. The device is closed to after-market applications due to the inability or restriction of the computing platform to add functionality.

By contrast, an open computing platform enables applications written for the operating system to be added and executed in daily use. The MICROSOFT® WINDOWS® platform may be considered as an example of an open platform for personal computers. In the arena of mobile handsets, the equivalent category of open platforms is known as smartphones which provide an environment for adding applications, without restriction, to execute on the device. Examples of smartphone platforms include Microsoft® SmartPhone, Symbian UIQ and Linux.

A third category of mobile handsets exists, which are Feature Phones equipped with a Run Time Environment (RTE). Examples of such run time environments include the Java J2ME (Java 2 Micro Edition) and BREW (Binary Runtime Environment for Wireless) environments. The RTE allows the handset to add new functionality in the form of applications created for the RTE—Java applets in the case of J2ME, and Brew authenticated applications in the case of the Brew environment. These applications differ from those that run on an open platform, because the applications are built for the RTE (e.g., and in some instance have to be authenticated by the RTE for proper operation) and not for the native OS, as in a smartphone. As such the RTE-enabled feature phone has limitations compared to the smartphone, some of which may be for technical reasons while other restrictions are commercially motivated.

For example, hardware device manufacturers, network operators, or RTE vendors, can enter into exclusive or semi-exclusive arrangements with application providers to provide applications and/or updates to applications to their specific hardware devices. Generally, the applications that run on a RTE are restricted in their ability to interface with the full device functionality. For example, the API (application programming interface) allowing control of the network stack, or of the storage peripherals on the device may not be accessible from the RTE. This is sometimes described as the RTE operating in its own "sandbox" within the native computing environment. Comparatively, in an open platform (e.g., Smart-Phone) each executable can run in its own process, and, generally, the operating systems of such open platforms can expose all of the device functionality to each of the running processes. Furthermore, some environments (Brew is one example) allow RTE applications to be added only across a network, and prevent applications being loaded into the device by means of a storage card. This can be problematic when loading large applications, such as large games, which require a lot of bandwidth and time to load across a network.

The herein described systems and methods ameliorate the shortcomings of existing practices by providing a means to add functionality to a closed platform. In an illustrative implementation, added functionality is provided to the hardware device as a PIDL. The closed platform can be created to include a "launcher" program, which comprises the dynamic linker/loader and PIDL stub file previously described, along with an application that cooperates with the PIDL. The launcher program can be built for and executes on the host operating system within the closed device, and can be resident in the device at the time of shipment. The combination of the launcher application plus the PIDL library serves to allow new functionality to operate on the closed device, even though this functionality is not present when the device ships, as follows. At run time, the PIDL can be made available to the device and the launcher application is started. The dynamic linker/loader within the launcher application, using information from the stub files, can act to load, link and bind the PIDL to the cooperating launcher program resident on the hardware device and running on the OS of the device. All of the functionality in the PIDL can therefore be exposed to the executing program within the device, thus achieving the desired result of making new functionality available on the closed device. In this context, the PIDL side steps the imposed hardware devices' constraints and operates to perform dynamic execution (as described above).

It will be understood that the "launcher" application may itself provide a set of functionality and does not depend for its operation on the presence of the PIDL. Similarly, the same launcher application may enable very many different types of new functionality, each provided in a separate PIDL library whose stub is compiled with the launcher application. With such an illustrative implementation, it can possible to simulate a kind of run time environment, where varied functions may be added dynamically.

By way of illustrative example, a launcher application may contain a software games console and one or more games. Further games may be added in the form of PIDL libraries, one PIDL for each different game, which are playable through the launcher application when the PIDL is downloaded to the device. Alternatively, the launcher application may provide basic messaging functions such as SMS. Further functions, such as email or multimedia messaging; video and audio players; browsing functions; file viewing; photo albums; PIM (personal information management); and other types of function may be deployed on the device as PIDL libraries which inter-operate with the launcher.

In another illustrative implementation, the closed device may be shipped with two or more "launcher" applications, each of which is built to recognize a specific set of PIDL libraries. In this way, the scope of add-on functionality can be extended and organized in significant ways.

The herein described methods and systems overcome existing practices when employed on a platform that otherwise is a closed platform. The possibility of offering after-market solutions can create greater utility for the device user, and increased revenue opportunities for the device or network provider. Since the method does not involve adding functions as executables (e.g., PIDL libraries can exist as data, not executable programs) the "closed-ness" of the platform can be controlled since it remains closed to normal applications created as executables for the device operating system. The device provider may determine in advance the range of additional functionality to be offered, since only those functions whose PIDL stub is compiled into the launcher will be operable. What results can be a set of dynamic security and commercial controls.

In an illustrative implementation, the PIDL can be provided to the device in several ways, including by download across a wireless or wired network, by data transfer from a tethered PC, and from a storage card inserted into the device. Another unique aspect of loading functions as PIDL objects rather than executable applications is that the PIDL may be safeguarded by Digital Rights management (DRM) techniques. The PIDL as a data file can be amenable to DRM technology unlike an executable program. This well established security scheme gives flexibility and confidence to both operators and users when adding functionality under a commercial transaction.

When combined with the platform independent nature of the PIDL object and linking scheme, as previously described, a device maker or network provider may offer add-on functionality as a single PIDL object across their entire range of devices, even when those devices employ different host platforms or operating systems. By avoiding the need to customize an application or library for each different platform, and simply offering a platform independent dynamic library (PIDL) that works equally on all platforms, the operator can be positioned to realize efficiencies and economies of scale.

The same methods and systems, described above with reference to a closed platform (such as a Feature Phone) may also be employed in platforms that support a run time environment (e.g., Java or Brew). This arrangement offers two ways for the device to add functionality—the conventional scheme of downloading applets or authenticated applications for consumption by the RTE, and an alternative implementation of loading functionality as PIDL libraries under control of a launcher application resident on the device.

In comparison to each other, the PIDL based scheme can provide added features that may not be present with the conventional run time environment. Stated differently, several pieces of functionality may be run concurrently when they are deployed as separate PIDLs within a single launcher application. In this context, with a PIDL implementation, the PIDL functions can execute under a common launcher process and as such can be available concurrently. Additionally, with the PIDL loading approach, there can be greater flexibility in the means of loading the functionality onto the device, including loading from storage card which is not allowed under certain run time environments (e.g., Brew). In the context of DRM, DRM can be realized when deploying the PIDL data library, a technique that may not be possible when deploying an executable application or applet to a run time environment. Also, if so desired, the device or network provider may also restrict the functions that can be added, to those functions that are recognized by the launcher application which ships with the device.

Unlike the strictly closed environment where the launcher is included at build time, a device having a run time environment (RTE) can take advantage of the ability to download the launcher application as an after-market procedure. When deployed in this way, the above-described dynamic library (DL) based scheme can co-exist with the RTE, whilst offering the above benefits that the RTE on its own fails to provide. In particular, the DL library can access device functions and APIs (such as the storage card) which are not accessible via the RTE. With such a scheme, a launcher application can thus be downloaded across an exemplary communications network to the device RTE, where the launcher acts as a proxy to allow further functionality to be added by other means such as storage card. Similarly, an RTE can often impose a maximum size for applications to run under the RTE. This maximum size can be circumvented to enable larger programs to be deployed to the device, by downloading a launcher application that itself is small and within a selected size limit, but which adds in DL libraries with functional code that exceed the limit. Since the DL libraries are loaded as binary data objects rather than as RTE applications, the RTE size limit does not apply to them.

Figure 13:
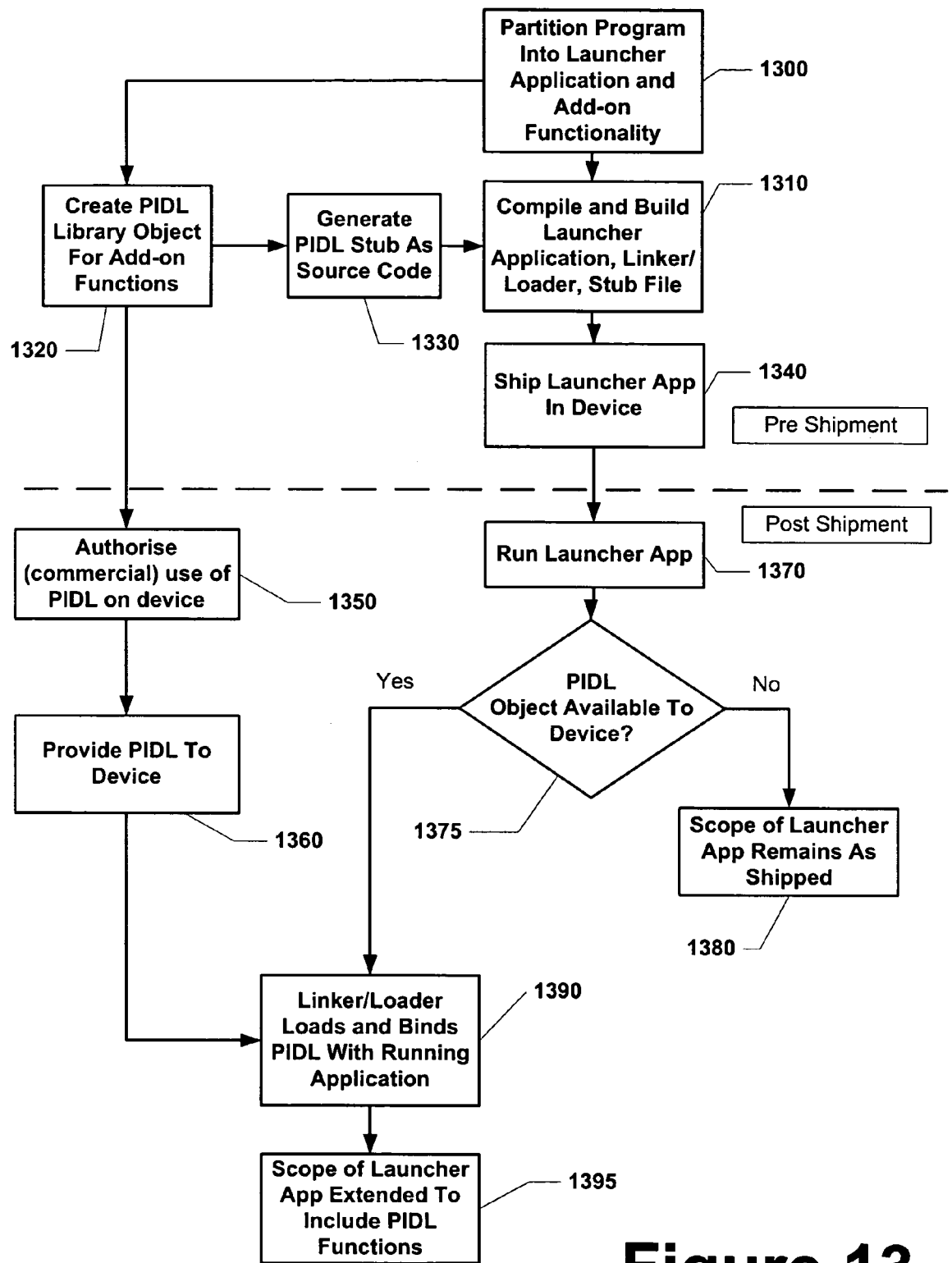
FIG. 13 is a flowchart diagram showing the processing performed when employing a platform independent binary object operating on a closed hardware environment offering add on functionality.

FIG. 13 shows the processing performed by an exemplary computing environment when handling a PIDL to realize dynamic execution in a closed computing environment. (The same processing may also be performed on an environment which is closed but provided with a conventional runtime environment and on an open computing environment). As is shown in FIG. 13, processing begins at block 1300 where functionality is partitioned into that to be provided within an exemplary launcher application resident on the device when shipped (not shown), and that can be provided as add-on functionality.

In an illustrative implementation and as shown in FIG. 13, a PIDL library object can be created at block 1320 containing the add-on functionality, and a stub file generated as source code at block 1330. The launcher application is compiled and built at block 1310, containing the as-shipped functions from block 1300, together with the stub file 1330 and a dynamic linker/loader. As indicated at block 1340, the launcher application can be included on the device at the time the device is shipped for use.

Following shipment of the device, the authorization to employ the add-on functionality can be provided at block 1350. As may be understood, this authorization can be predicated on a commercial transaction, or other criteria according to the circumstances of deploying the device. Following authorization, the PIDL library can be made available to the device at block 1360, by suitable means which may include but are not limited to download to device memory, network transfer, or provision from a storage device or card attached to the device. The launcher application, present on the device, can then be run at block 1370. From there a check can be performed at block 1375, to determine if the PIDL object is available to the device. This check can be performed by the dynamic linker/loader within the launcher application, using information from the PIDL stub file compiled at block 1310. If the check at block 1375 indicates that the PIDL is not available to the device, processing proceeds to block 1380 where the launcher application continues to execute but with a scope of functionality identical to the functionality of the device as shipped (i.e., excluding the further functionality contained in the PIDL).

However, if at block 1375, the check indicates that the PIDL library is available to the device, processing proceeds to block 1390 where the PIDL is loaded, linked and bound to the launcher application. By this step, the scope of functionality accessible from the launcher application is extended, as shown in block 1395, to include the functions present in the PIDL.

Figure 14:
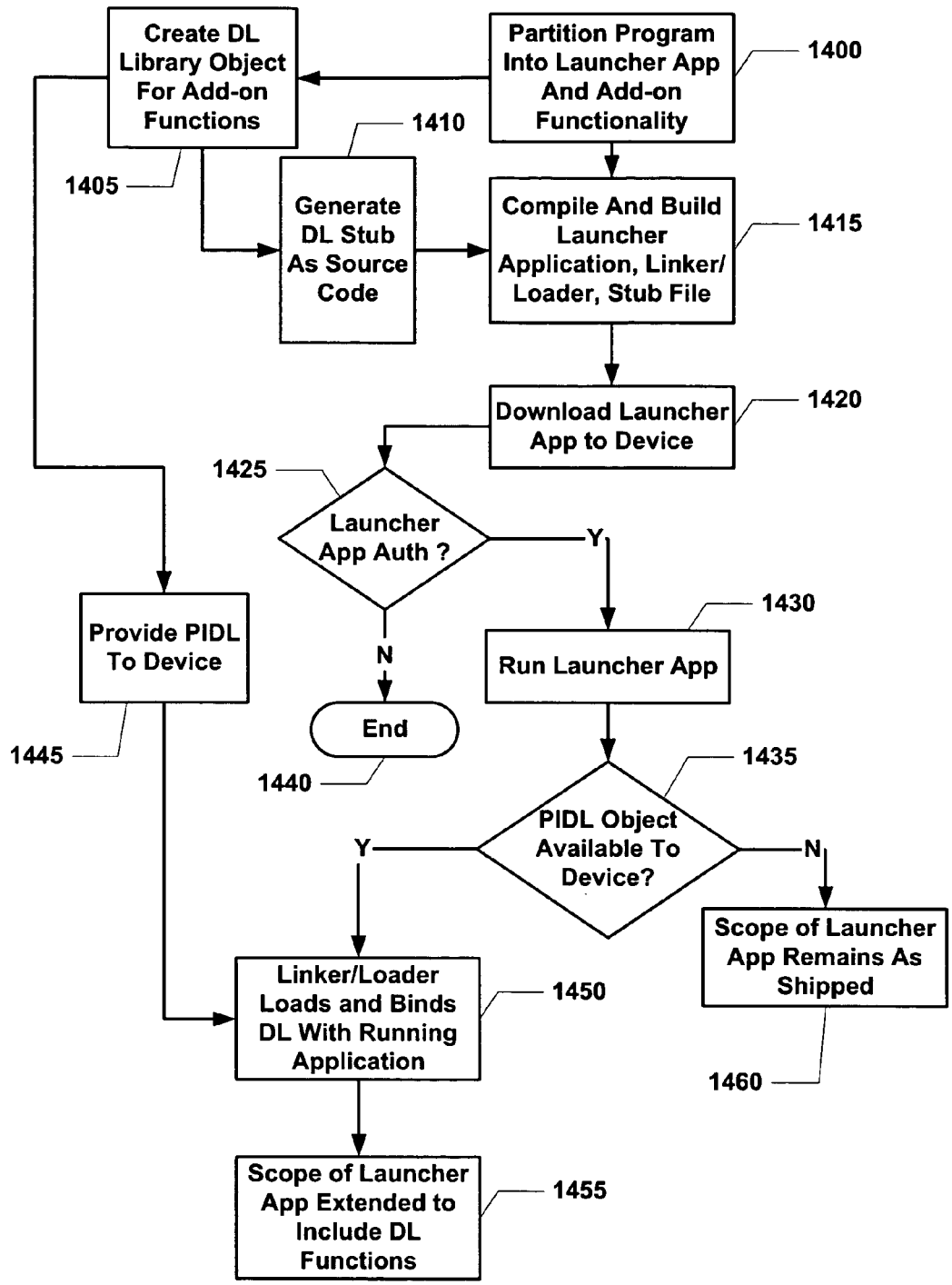
FIG. 14 is a flowchart diagram showing the processing performed through the download of a launcher application to provide additional functionality to a restricted computing environment in accordance with an illustrative implementation of the herein described systems and methods.

FIG. 14 shows the processing performed when providing additional functionality through the download of a launcher application. Such processing can occur after an exemplary computing device has shipped, as in the case of downloading to an open environment, or of downloading a launcher application to operate in conjunction with an existing RTE on the device. Such processing can also occur as a unique incidence of downloading an application to a closed environment that remains closed to a downloading operation or closed to the addition of other computing applications (e.g., apart from the launcher). The launcher can operate in such a manner (e.g., to download) through the use of technical or commercial controls.

As is shown, processing begins at block 1400 where a program is portioned into a launcher application and add-on functionality. From there processing can fork to block 1415 or 1405. At block 1405 a dynamic library (DL) object for add-on functionality is created. At block 1415 the launcher application, linker/loader, and stub file are compiled and built. From block 1405, processing further splits. From block 1405, processing can proceed to block 1410 where a stub file for the DL is generated as source code. From there, processing proceeds to block 1415 and proceeds from there. Also, from block 1405, processing can proceed to block 1445 where the DL is provided to a cooperating device (e.g., mobile telephone). From block 1445, processing proceeds to block 1450, discussed below.

From block 1415, processing proceeds to block 1420 where the launcher application is downloaded to a device. A check is then performed at block 1425 to determine if the downloaded launcher application is authorized to operate on the device to which it was downloaded. If the check at block 1425 indicates that the launcher application was not authorized, processing terminates at block 1440. However, if at block 1425 it is determined that the launcher application is authorized to operate on the device, processing proceeds to block 1430 where the launcher application is run. A check is then performed at block 1435 to determine if the DL is available to the device via block 1445, discussed above. If the check at block 1435 indicates that the DL is not available to the device, the scope of the launcher application remains as shipped and does not extend to additional functionality provided by a DL. However, if at block 1435, the check indicates that a DL is available to the device, processing proceeds to block 1450 where the linker/loader loads and binds the DL with a running application. Processing proceeds to block 1455 and continues from there. The scope of the launcher application is then extended to include DL functions at block 1455.

It is appreciated that the processing described in FIG. 14 can be applied to download a single launcher application or to download multiple launchers. Such launchers can operate to add selected functionality according to the library stub files that can be included at the time of the launcher application build.

In sum, the herein described apparatus and methods provide a platform independent binary object operable across disparate computing environments operating various platforms. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computing environments maintaining programmable computers that include a processor, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A computing apparatus comprising data storage media storing machine-readable instructions for dynamically linking a binary object file in a constrained computing environment that does not have a native dynamic linking mechanism, said instructions comprising:
   a platform independent dynamic library (PIDL) comprising an object file having a selected structure;
   a parser operating on the PIDL to extract symbols and properties from the object file to generate a based stub file which is a file of source code in a high level language derived from the PIDL, the stub file cooperating with a computing application operable in the constrained environment; and
   a binary executable program for the constrained computing environment, said binary executable program created by compiling and linking source code for the computing application, which is combined with the stub file, with source code for a dynamic linker/loader to allow the binary executable program executing in the constrained environment to dynamically link to and cooperate with the PIDL.

2. The computing apparatus as recited in claim 1 wherein the PIDL comprises any of a linked library and a platform independent code library.

3. The computing apparatus as recited in claim 1 wherein the PIDL selected structure comprises any of the executable and linking format (ELF) and the portable executable (PE).

4. The computing apparatus as recited in claim 1 wherein the computing application, the source code for the stub file, and the source for the dynamic linker/loader are compiled and linked into a binary executable program for a selected platform operating on the constrained environment.

5. The computing apparatus as recited in claim 4 wherein the dynamic linker/loader operates on the PIDL to load the PIDL onto the constrained environments during the execution of the program.

6. The computing apparatus as recited in claim 4 wherein the dynamic linker/loader operates on the PIDL to link the PIDL with the cooperating computing application during the execution of the program.

7. The computing apparatus as recited in claim 5 or 6 wherein the dynamic linker/loader comprises a component of the executable program.

8. The computing apparatus as recited in claim 5 or 6 further comprising an interface module providing the PIDL access to the computing application.

9. The computing apparatus as recited in claim 8 wherein the interface module comprises source code to allow the PIDL to call selected functions in the computing application.

10. The computing apparatus as recited in claim 9 wherein source code of the interface module is compiled with the computing application for the selected constrained computing environment.

11. The computing apparatus as recited in claim 5 or 6 wherein the dynamic linker/loader handles symbol resolution and relocation to bind the computing application and the PIDL.

12. The computing apparatus as recited in claim 1 wherein a library source code is compiled to generate the PIDL, comprising any of binary code and data.

13. A method to dynamically link a binary object in a constrained environment having no mechanism for dynamic linking of binary objects comprising:
   providing a platform independent library (PIL) comprising an object file having a selected structure;
   providing source code for a dynamic linker/loader;
   a parser operating on the PIL to extract symbols and properties from the object file to generate a stub file, which is a file of source code in a high level language derived from the PIL; and
   creating a binary executable program, executable on the constrained environment by compiling the dynamic linker/loader and the stub file with a cooperating computing application, thereby allowing the binary executable program to have access to and cooperate with the (PIL).

14. The method as recited in claim 13 further comprising selecting the object file as a file comprising any of the executable and linking format (ELF) and portable executable (PE) file structures.

15. The method as recited in claim 14 further comprising generating the PIL for the constrained environment operating on a selected hardware architecture.

16. The method as recited in claim 15 further comprising selecting the hardware architecture from architectures comprising any of a reduced instruction set computer (RISC) and complex instruction set computer (CISC) hardware architectures.

17. The method as recited in claim 13 further comprising loading the PIL onto the constrained computing environment by the dynamic linker/loader during the loading of the binary executable program.

18. The method as recited in claim 17 further comprising linking the PIL with the cooperating computing application during the loading of the binary executable program.

19. The method as recited in claim 18 further comprising handling resolution and relocation of PIL symbols for use by the cooperating computing application by the dynamic linker/loader.

20. A computer readable medium having computer readable instructions to instruct a constrained environment that does not perform dynamic linking of binary objects to handle dynamic linking of binary objects comprising:
   generating a platform independent dynamic library (PIDL) having an object file having a selected structure comprising any of executable and linking format (ELF) and portable executable (PE) file structure;
   parsing the PIDL to extract symbols and properties from the object file to generate a stub file-which is a file of source code in a high level language;
   compiling source code for the stub file, source code for a dynamic loader/linker, and source code for a cooperating computing application to create a binary executable program for the constrained environment; and
   linking the PIDL with the binary executable program by the dynamic loader/linker for execution on the constrained environment.

21. The computer readable medium as recited in claim 20 further comprising providing an application program interface providing the PIDL access to functions contained in the cooperating computing application.

22. The computer readable medium as recited in claim 21 wherein the dynamic loader/linker operates to perform symbol resolution and look up for PIDL symbols during run-time of a cooperating computing application.

23. A method to dynamically link a library in a computing environment not supporting dynamic linking, comprising:
   providing a library source code;
   compiling the library source code to generate a code library (CL) comprising an object file having a selected structure;
   parsing the CL to extract symbols and properties from the object file to generate a stub file that is a file of source code in a high level language and which cooperates with the CL;
   compiling and building the stub file with source code for a dynamic linker/loader, and source code for a cooperating computing application to create an executable program executable on the computing environment;
   loading the CL in memory of the computing environment; and
   linking the CL to resolve and relocate CL symbols for use by the cooperating computing application executable on the computing environment.

24. The method as recited in claim 23 further comprising selecting a file format comprising any of the executable and linking format (ELF) and portable executable (PE) file formats.

25. The method as recited in claim 24 further comprising providing a linker/loader operable exclusively on the computing environment.

26. A method to distribute a computing library update for use in a constrained computing environment not capable of performing dynamic linking of binary object files, comprising:
   creating a platform independent dynamic library (PIDL) comprising an object file having a selected structure and being operable with a stub file that is generated by parsing the PIDL to extract symbols and properties from the object file such that the stub file is a file of source code in a high level language; wherein the stub file is compiled with a cooperating computing application and a dynamic linker/loader as part of an executable program operable on the constrained environment; and
   communicating the PIDL to the constrained environment over a communications network.

* * * * *

UNITED STATES PATENT AND TRADEMARK OFFICE
CERTIFICATE OF CORRECTION

PATENT NO. : 7,533,376 B2  Page 1 of 1
APPLICATION NO. : 10/964232
DATED : May 12, 2009
INVENTOR(S) : Anwar et al.

It is certified that error appears in the above-identified patent and that said Letters Patent is hereby corrected as shown below:

At column 26, line 23 of claim 1, please delete the word "based".

Signed and Sealed this

Sixteenth Day of March, 2010

David J. Kappos
*Director of the United States Patent and Trademark Office*